(12) United States Patent
Morrison

(10) Patent No.: US 8,099,113 B2
(45) Date of Patent: Jan. 17, 2012

(54) PASSIVE TRAFFIC ALERT AND COMMUNICATION SYSTEM

(75) Inventor: James Morrison, Henderson, NV (US)

(73) Assignee: Global Alert Network, Inc., Howard, PA (US)

( * ) Notice: Subject to any disclaimer, the term of this patent is extended or adjusted under 35 U.S.C. 154(b) by 966 days.

(21) Appl. No.: 11/970,922

(22) Filed: Jan. 8, 2008

(65) Prior Publication Data

US 2009/0176512 A1    Jul. 9, 2009

(51) Int. Cl.
*H04W 24/00*    (2009.01)

(52) U.S. Cl. .................................................. 455/456.6

(58) Field of Classification Search ............... 455/456.6, 455/406; 701/201, 213, 209, 211, 217, 202, 701/117, 36; 340/593.13, 995.19, 909, 905; 342/357.09, 357.1, 357.06, 342.12; 375/150
See application file for complete search history.

(56) References Cited

U.S. PATENT DOCUMENTS

| | | | |
|---|---|---|---|
| 4,894,642 A | 1/1990 | Ashbaugh et al. | |
| 5,021,780 A | 6/1991 | Fabiano et al. | |
| 5,091,906 A | 2/1992 | Reed et al. | |
| 5,181,027 A | 1/1993 | Shafer | |
| 5,235,329 A | 8/1993 | Jackson | |
| 5,289,181 A | 2/1994 | Watanabe et al. | |
| 5,307,060 A | 4/1994 | Prevulsky et al. | |
| 5,402,117 A | 3/1995 | Zijderhand | |
| 5,440,489 A | 8/1995 | Newman | |
| 5,554,982 A * | 9/1996 | Shirkey et al. | 340/903 |
| 6,236,336 B1 | 5/2001 | Oliva et al. | |
| 6,411,220 B1 * | 6/2002 | Davis et al. | 340/905 |
| 6,590,507 B2 | 7/2003 | Burns | |
| 6,882,837 B2 | 4/2005 | Fernandez et al. | |
| 6,944,679 B2 * | 9/2005 | Parupudi et al. | 709/246 |
| 6,973,384 B2 | 12/2005 | Zhao et al. | |
| 6,990,407 B1 * | 1/2006 | Mbekeani et al. | 701/117 |

(Continued)

FOREIGN PATENT DOCUMENTS

JP    2003217088 A1    7/2003

(Continued)

OTHER PUBLICATIONS

"U.S. Appl. No. 12/402,286, Non Final Office Action mailed Jan. 3, 2011", 14 pgs.

(Continued)

*Primary Examiner* — Melody Mehrpour
(74) *Attorney, Agent, or Firm* — Schwegman, Lundberg & Woessner, P.A.

(57) ABSTRACT

A passive traffic alerting method includes: identifying traffic events from analyzing traffic information; selecting an identified traffic event based on a location of a mobile communicator; and alerting the mobile communicator with a passive message regarding the selected traffic event with or without prompting the mobile communicator to launch an application on a mobile communication device. In some cases a user-zone and an event zone is selected and the user gets alerted when his user-zone overlaps with the event-zone. The alert can contain hierarchical messages. The method may include: determining an alert zone by rating a traffic incident and overlaying maps of the incident, the cell-phone towers, and the corresponding road network; acquiring user identification of cell phone users from data from cell-phone towers in the alert-zone; identifying subscribers from acquired cell-phone tower data; matching subscribers with alerts in appropriate formats; and sending the appropriate alert messages to cell phones of identified subscribers.

54 Claims, 20 Drawing Sheets

U.S. PATENT DOCUMENTS

| | | | |
|---|---|---|---|
| 7,099,774 B2 | 8/2006 | King et al. | |
| 7,260,472 B2 | 8/2007 | Sutardja | |
| 7,319,931 B2 * | 1/2008 | Uyeki et al. | 701/209 |
| 7,385,499 B2 | 6/2008 | Horton et al. | |
| 7,502,687 B2 | 3/2009 | Flick | |
| 7,609,203 B2 * | 10/2009 | Dockemeyer et al. | 342/357.42 |
| 7,653,480 B2 * | 1/2010 | Tsuge et al. | 701/117 |
| 7,764,946 B1 | 7/2010 | Sennett et al. | |
| 7,769,544 B2 | 8/2010 | Blesener et al. | |
| 7,898,407 B2 * | 3/2011 | Hufton et al. | 340/539.11 |
| 2003/0014187 A1 | 1/2003 | Chun et al. | |
| 2003/0046541 A1 | 3/2003 | Gerdes et al. | |
| 2004/0203851 A1 | 10/2004 | Vetro et al. | |
| 2005/0250440 A1 | 11/2005 | Zhou et al. | |
| 2005/0266894 A9 | 12/2005 | Rankin | |
| 2006/0089160 A1 | 4/2006 | Othmer | |
| 2006/0246911 A1 | 11/2006 | Petermann | |
| 2007/0091836 A1 | 4/2007 | Oprescu-Surcobe et al. | |
| 2007/0149214 A1 | 6/2007 | Walsh et al. | |
| 2007/0265006 A1 | 11/2007 | Washok et al. | |
| 2007/0299601 A1 * | 12/2007 | Zhao et al. | 701/201 |
| 2008/0083000 A1 | 4/2008 | Orrell et al. | |
| 2009/0118995 A1 | 5/2009 | Zhao et al. | |
| 2009/0163183 A1 | 6/2009 | O'donoghue et al. | |
| 2009/0176511 A1 | 7/2009 | Morrison | |
| 2009/0209233 A1 | 8/2009 | Morrison | |
| 2009/0233575 A1 | 9/2009 | Morrison | |
| 2009/0233633 A1 | 9/2009 | Morrison | |
| 2009/0299857 A1 | 12/2009 | Brubaker | |
| 2009/0315770 A9 * | 12/2009 | Abraham et al. | 342/357.12 |
| 2010/0069093 A1 | 3/2010 | Morrison | |

FOREIGN PATENT DOCUMENTS

| | | | |
|---|---|---|---|
| KR | 20030041112 A | | 5/2003 |
| KR | 1020030041112 A1 | | 5/2003 |
| KR | 1020050017256 A | | 2/2005 |
| KR | 1020070005762 A | | 1/2007 |
| KR | 1020070071664 A | | 7/2007 |
| WO | WO-2009089246 A2 | | 7/2009 |
| WO | WO-2009089251 A2 | | 7/2009 |

OTHER PUBLICATIONS

"U.S. Appl. No. 12/566,012, Non Final Office Action mailed Dec. 28, 2010", 12 pgs.

"International Application No. PCT/US2009/030271, International Search Report mailed Aug. 20, 2009", 3 pgs.

"International Application No. PCT/US2009/030278, International Search Report mailed Aug. 27, 2009", 3 pgs.

"International Application No. PCT/US2009/030278, Written Opinion mailed Aug. 27, 2009", 4 pgs.

"U.S. Appl. No. 12/402,286, Final Office Action mailed Apr. 14, 2011", 15 pgs.

"U.S. Appl. No. 12/402,286, Response filed Apr. 4, 2011 to Non Final Office Action mailed Jan. 3, 2011", 15 pgs.

"U.S. Appl. No. 12/402,310, Non Final Office Action mailed Apr. 7, 2011", 11 pgs.

"U.S. Appl. No. 12/566,012, Non Final Office Action mailed Apr. 20, 2011", 16 pgs.

"U.S. Appl. No. 12/566,012, Response filed Mar. 25, 2011 to Non Final Office Action mailed Dec. 28, 2010", 16 pgs.

"U.S. Appl. No. 12/566,012, Response filed Mar. 28, 2011 to Non Final Office Action mailed Dec. 28, 2010", 16 pgs.

"U.S. Appl. No. 12/251,155, Non Final Office Action mailed Jun. 29, 2011", 14 pgs.

"U.S. Appl. No. 12/351,641, Notice of Allowance mailed Aug. 12, 2011", 6 pgs.

"U.S. Appl. No. 12/402,286, Advisory Action mailed Jul. 1, 2011", 3 pgs.

"U.S. Appl. No. 12/402,286, Response filed Jun. 14, 2011 to Final Office Action mailed Apr. 14, 2011", 8 pgs.

"U.S. Appl. No. 12/566,012, Final Office Action mailed Aug. 11, 2011", 17 pgs.

"U.S. Appl. No. 12/566,012, Response filed Jul. 20, 2011 to Non Final Office Action mailed Apr. 20, 2011", 17 pgs.

* cited by examiner

111 — collecting traffic information from a plurality of traffic data providers

112 — optionally creating a traffic-assessment by modeling traffic using collected traffic information 113 — identifying a traffic event by integrating collected traffic information and optionally the traffic assessment

121 —

122 — determining a location of the mobile communicator from location data provided by mobile communication stations of a mobile communication network or from data provided by a global positioning system 123 — selecting the user-zone as an area centered at the location of the mobile communicator with a shape and extent

FIG. 4

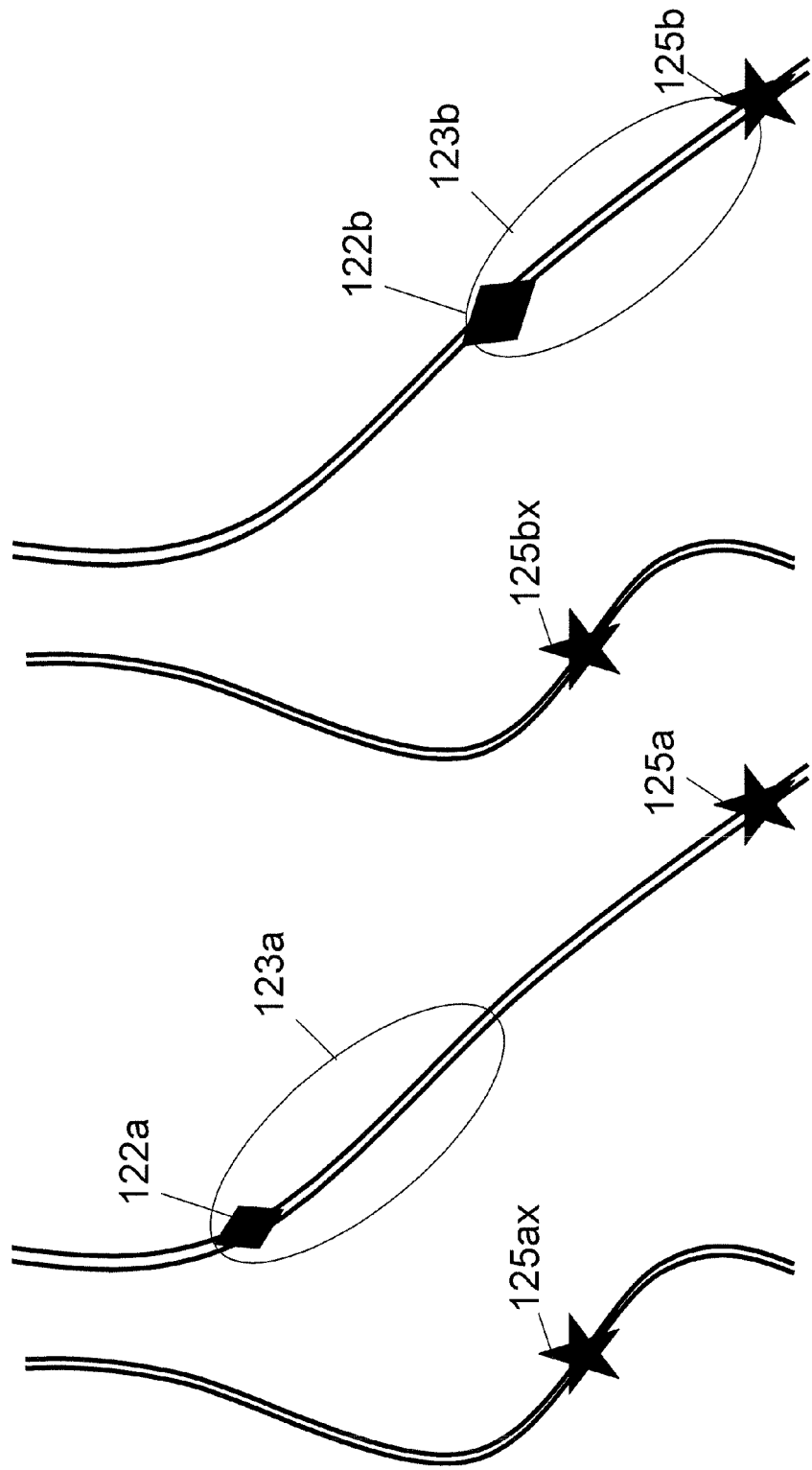

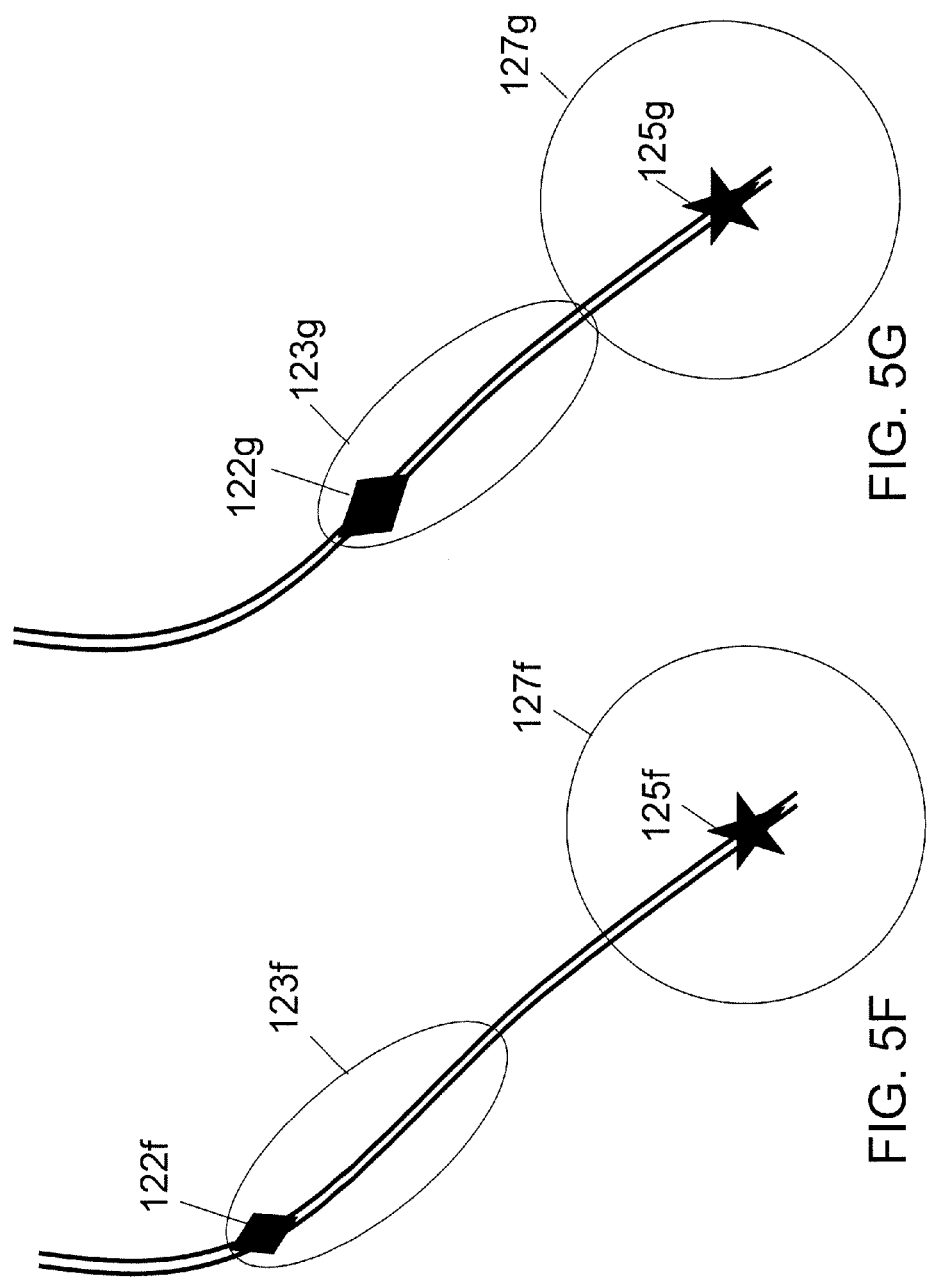

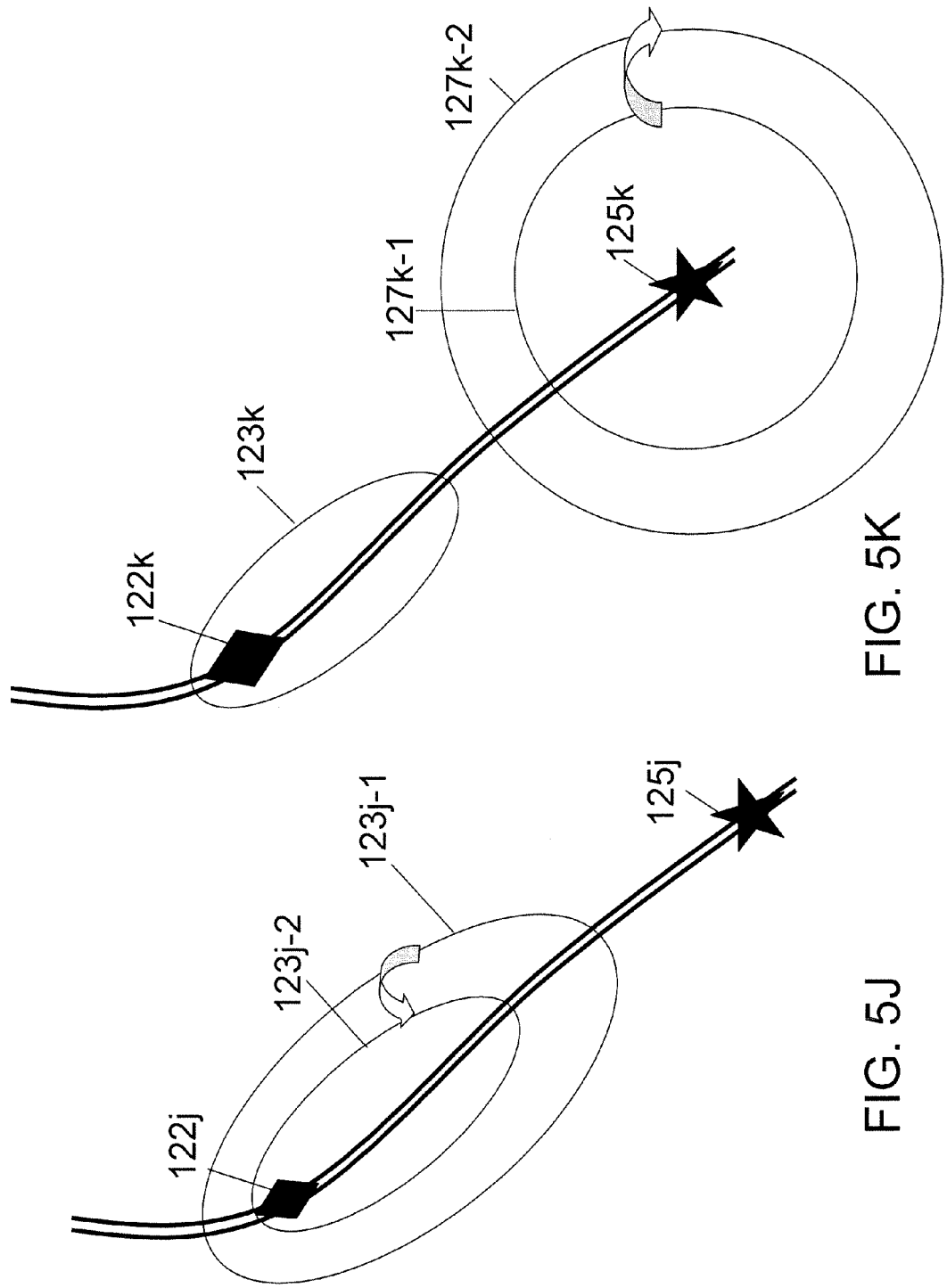

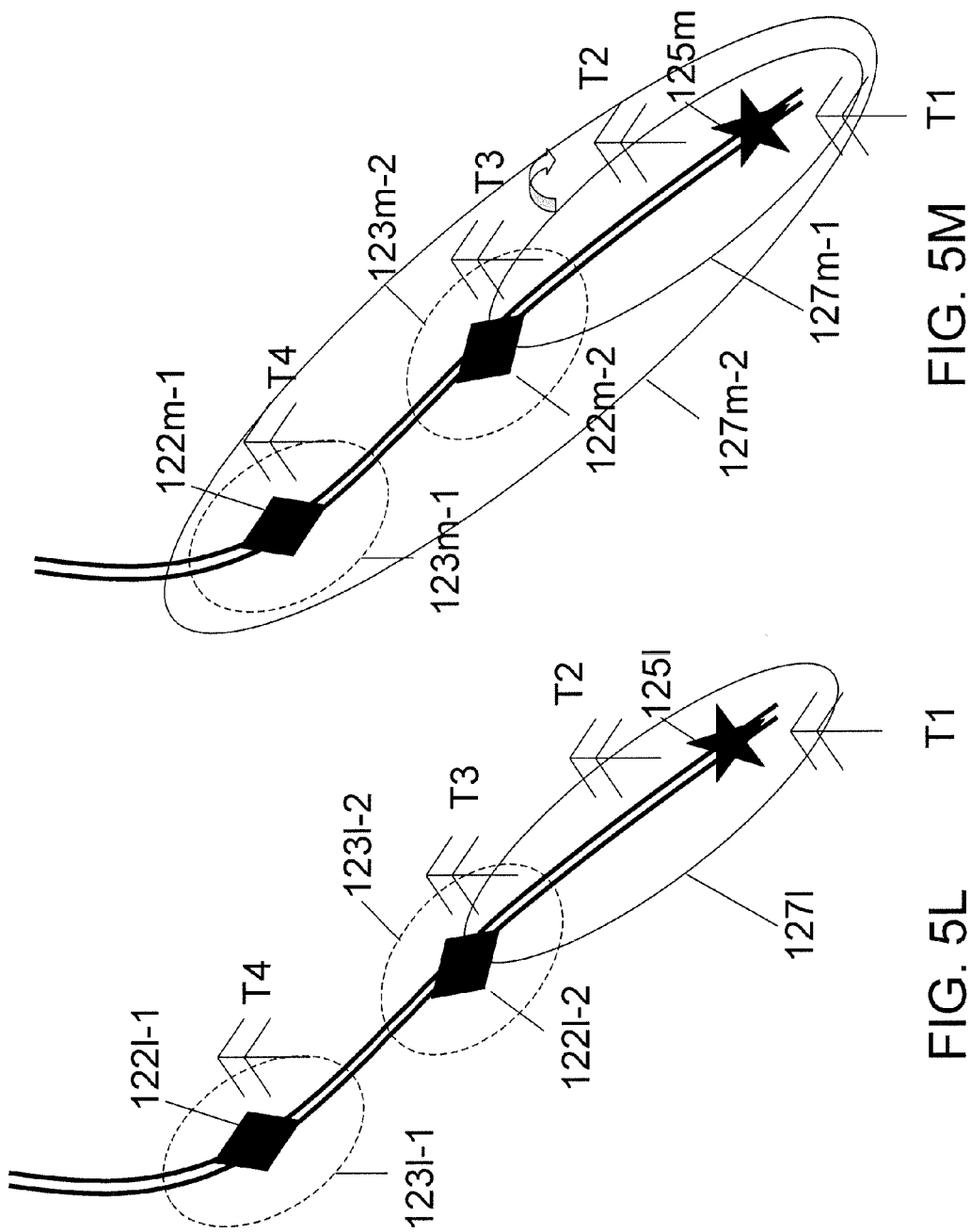

PASSIVE TRAFFIC ALERT AND COMMUNICATION SYSTEM

BACKGROUND

1. Field of Invention

The present invention relates to traffic information systems, more precisely to personalized passive alert traffic information systems.

2. Description of Related Art

With great progress on every front of telecommunications, many new types of uses of these technologies emerge. One thrust of evolution involves providing traffic information more efficiently. At this time, traffic information is gathered in a somewhat disorganized manner. It is also relayed through inefficient channels.

Presently, the traffic information is often gathered from police reports, or the traffic helicopters of news channels, or road-side sensors. However, after an initial announcement of an overturned truck blocking traffic, the police may fail to inform the news channels that the overturned truck has been removed. Or the road side sensors may not appreciate that a lack of "slow car speed" signals does not necessarily indicate an "all clear" traffic condition. Famously, when the 35W bridge collapsed in Minneapolis in 2007, the roadside sensors signaled "normal traffic" several hours after the bridge collapse and total paralysis of the Minneapolis traffic. Thus, presently used traffic information may be outdated or incorrectly interpreted in some systems. Therefore, current methods of reporting traffic information are not necessarily reliable and leave room for improvements.

Further, the present methods of broadcasting traffic information are quite ineffective as well. In a larger metropolitan area news channels typically broadcast a long traffic report, which may list many traffic delays, accident and other problems all over the metropolitan area. However, most of these reports are not relevant for any particular driver on a particular road, forcing most users of this service to be exposed to unnecessarily long announcements. Worse yet, drivers inundated with a long report of traffic problems may get numbed and miss the one report which was relevant for their commute.

Various electronic service providers now offer devices which deliver more personalized traffic information. However, in many cases the driver has to enter e.g. on a webpage or into the device itself the specific route he or she is going to take, or store in a memory his/her typical commute route. In return, the service provides the road conditions only for the entered or stored roads. Thus, if e.g. a driver takes a less customary road on a given day and forgot to enter his choice, the provided traffic information is less useful. Further, the service provides the overall traffic information, not the one relevant for the particular location of the driver on the road, such as a convenient exit to take, or what is the expected time delay given the driver's location.

Also, many of these services require the driver to actively manipulate the device, e.g. launch an application on a cell phone. This requirement is problematic, as an increasing number of states and countries now require that the driver shall not divert his or her attention from driving by e.g. banning manual handling of cell phones. And even if a driver is prepared to launch an application, this interrupts the function presently carried out by the cell phone, such as the conversation the driver was having. Finally, many of these services are fee based—another inconvenience.

All of the aspects of present traffic delivery systems, described above, define areas where improvements are called for.

SUMMARY

Briefly and generally, a new passive traffic alerting method may include the steps of: identifying traffic events from analyzing traffic information; selecting an identified traffic event based on a location related to a mobile communicator; and alerting the mobile communicator with a passive message regarding the selected traffic event without prompting the mobile communicator to launch an application on a mobile communication device.

Some embodiments include the steps of: identifying traffic events from analyzing traffic information; selecting an identified traffic event based on a location related to a mobile communicator; and alerting the mobile communicator with a passive message regarding the selected traffic event without prompting the mobile communicator to launch an application on a mobile communication device.

Some embodiments include the steps of: identifying traffic events from analyzing traffic information; selecting a user-zone based on a location related to a mobile communicator; selecting an identified traffic event based on a relation of identified traffic events and the user-zone; and alerting the mobile communicator with a passive message regarding the selected traffic event.

Some embodiments include the steps of: identifying traffic events from analyzing traffic information; selecting an identified traffic event based on a location related to a mobile communicator; and alerting the mobile communicator regarding the selected traffic event with a plurality of messages in a hierarchical manner.

Some embodiments include the steps of: determining an alert zone by rating a traffic incident and overlaying a map of the incident, a map of cell-phone towers, and a map of a corresponding road network; acquiring user identification of cell phone users from data from cell-phone towers in the alert-zone; identifying subscribers from acquired cell-phone tower data; matching subscribers with appropriate alerts; sending appropriate alert messages to cell phones of identified subscribers.

Some embodiments include the steps of: receiving traffic alert information and start composing an alert message in response; composing alert message; compiling alert message in different formats; routing differently formatted alert messages to subscribers expecting that format; sending the routed alert messages to the corresponding subscribers through matching gateways of a service provider and a cell-phone carrier.

BRIEF DESCRIPTION OF THE DRAWINGS

FIG. 2 illustrates the sub-steps 111-113 of the identifying and analyzing step 110.

FIG. 4 illustrates the sub-steps 122-123 of user-zone selecting sub-step 121.

DETAILED DESCRIPTION

Figure 1:
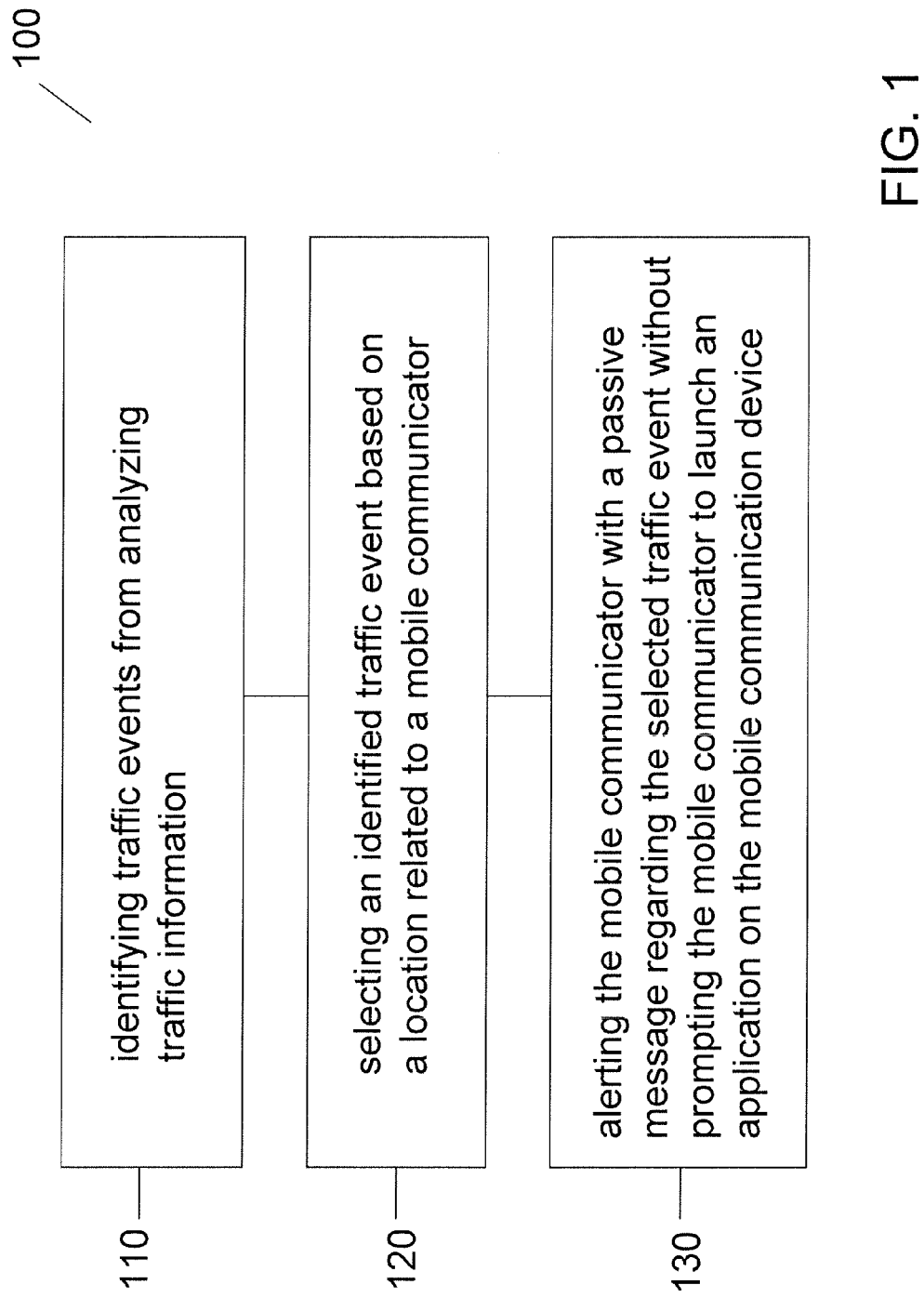
FIG. 1 illustrates the steps 110-130 of passive traffic alerting method 100.

FIG. 1 illustrates a passive traffic alerting method 100. The passive alerting method 100 can include: identifying traffic events from analyzing traffic information (step 110); selecting an identified traffic event based on a location related to a mobile communicator (step 120), and alerting the mobile communicator with a passive message regarding the selected traffic event without prompting the mobile communicator to launch an application on a mobile communication device (step 130).

FIG. 2 illustrates that step 110 may include collecting traffic information from a plurality of traffic data sources (step 111) and identifying a traffic event by integrating collected traffic information (step 113). Step 113 may include identifying an accident, a traffic slow-down, a traffic-jam, a road-construction, and a traffic condition. Besides typical accidents, such traffic events can be caused e.g. by a sporting event, an entertainment event, a weather event, or a traffic control event. Typical examples include a sudden downpour causing slippery roads, leading to an accident involving several vehicles. Such an accident can give rise to extensive delays. Other examples include a concert or a sporting event, where the large number of vehicles converging on the same location causes major delays without any accident. Note that the inverse of the above cases can also be a noteworthy traffic event: e.g. the removal of an overturned truck, or the opening of an exit which was under construction up to the opening.

A common aspect of these traffic events is the change in the speed of traffic, typically a slow-down. Traffic data providers developed different technologies to recognize, identify and track such slow-down of the traffic. Sources of such traffic data include: the police, issuing police reports on an accident; news organizations, operating helicopters and reporting over broadcast systems (e.g. a TV station operating its own traffic chopper and broadcasting its report live); mobile telephone companies, who acquire information about the speed of vehicles by tracking how quickly mobile phone signals move from cell-phone tower to cell-phone tower; various traffic reporting/controlling agencies, who e.g. deploy a large network of sensors into the road surface and collect the data generated by these sensors, or deploy a large number of traffic cameras which observe traditional traffic bottlenecks; and road construction companies, who knowingly cause traffic delays by closing a lane or an exit for repair.

Remarkably, any one of these traffic data sources can provide incomplete data. For example, a cell phone tower senses not only the vehicles passing by on the highway but also the vehicles passing by on a nearby residential road. A red light stopping vehicles on this residential road can be falsely interpreted by the tower's unsophisticated system as a signal of a traffic-jam on the highway itself, creating a false alert. Or, sensors built into the road surface may misinterpret signals, as mentioned above in relation to a bridge collapse. Or the police/highway patrol may accurately announce when a truck overturned on a highway, but fail to report when the overturned truck is removed, leading to continued reporting of an accident which has been cleared up since.

FIG. 2 illustrates that such inefficiencies can be drastically reduced by collecting traffic information from a plurality of traffic data sources in step 111, and integrating the collected traffic information in step 113. In an example of step 111, if a mobile phone operator reports a slowdown of traffic from its cell-tower data, a traffic reporting organization (TRO), or a traffic service provider (TSP) may acquire additional traffic information from a second source of traffic data such as a live-feed from a video camera, which is pointed at the corresponding segment of the highway. Then in step 113, the TRO may integrate the traffic information from the two sources by cross referencing the cell tower data with the video camera feed to verify that indeed an accident occurred. The integrating step 113 may involve checking that the video camera feed corresponds to the same segment of the highway as the cell tower data. Or if the police do not issue an "all-clear" after an initial report of an overturned truck, a TRO may perform step 111 by directing a news chopper to the impacted section of the highway and ask for additional information. Then, in step 113, the TRO may instruct the chopper to check whether the overturned truck has been removed, describing in detail which segment of the highway the police report referred to.

Often the traffic information is complex and unusual situations and correlations occur. In many embodiments of the integrating step 113 the complex information is integrated by human intervention: an employee of the TRO summarizes the cell-tower data and cross references it with the video feed from a traffic helicopter.

In embodiments of step 111, which collect traffic information from cell-tower data, issues of privacy may be involved. To alleviate any potential problems, embodiments of the present method make sure that only anonymous information is used. For example, the actual ID of the cell phone users is not recorded or reported, only the average speed of the cell phone users, inferred e.g. from how quickly they move from cell-tower to cell-tower.

In some embodiments the analysis step 110 also involves step 112: a modeling of the traffic. For example, "neural network" models, or "real-time traffic" models can be used for modeling traffic in step 112. These models can be used to generate a traffic assessment. These assessments include predicting what kind of traffic delays will be caused by a freshly overturned truck in 10, 20, or 30 minutes, on what time scale will the traffic-jam dissipate, and how will the changing traffic patterns (such as motorists taking alternate routes) impact these predictions. There are a vast number of such traffic models and using any one of these models is understood to be within the scope of the step 112. In multi-level modeling embodiments, more than one method can be employed to generate traffic predictions and then a second level evaluator may chose which model's prediction should be accepted as the traffic assessment. In such embodiments the step 113 may involve integrating traffic data acquired in step 111 with the traffic assessments, generated during the modeling step 112.

An example can be that in a step 111 a TSP is informed about a lane closure and the TSP comes to the idea to suggest an alternate route to avoid delays. Then, a modeling step 112 is carried out to estimate whether the idea of a no-delay alternate route is verified by modeling. The modeling instead comes to the conclusion that a 10 minute delay will be likely caused by the excess traffic. In an additional step 111 the TSP acquires further traffic information in the form of road-embedded sensor data to check whether the vehicle speed on the alternate route is indeed consistent with the 10 minutes delay prediction of the modeling. The acquired road sensor data, however, indicates only a 5 minutes delay. Finally, in an embodiment of step 113, the original lane closure information, the modeling prediction of 10 minutes delay, and the road sensor data, indicating only 5 minutes delay, are integrated, enabling the TSP to identify a traffic event of the lane closure and the accompanying 5-10 minutes delay on the alternate route. The sequence of these steps can be reordered, and some steps can be carried out more than once, as in the just described embodiment.

Figure 3:
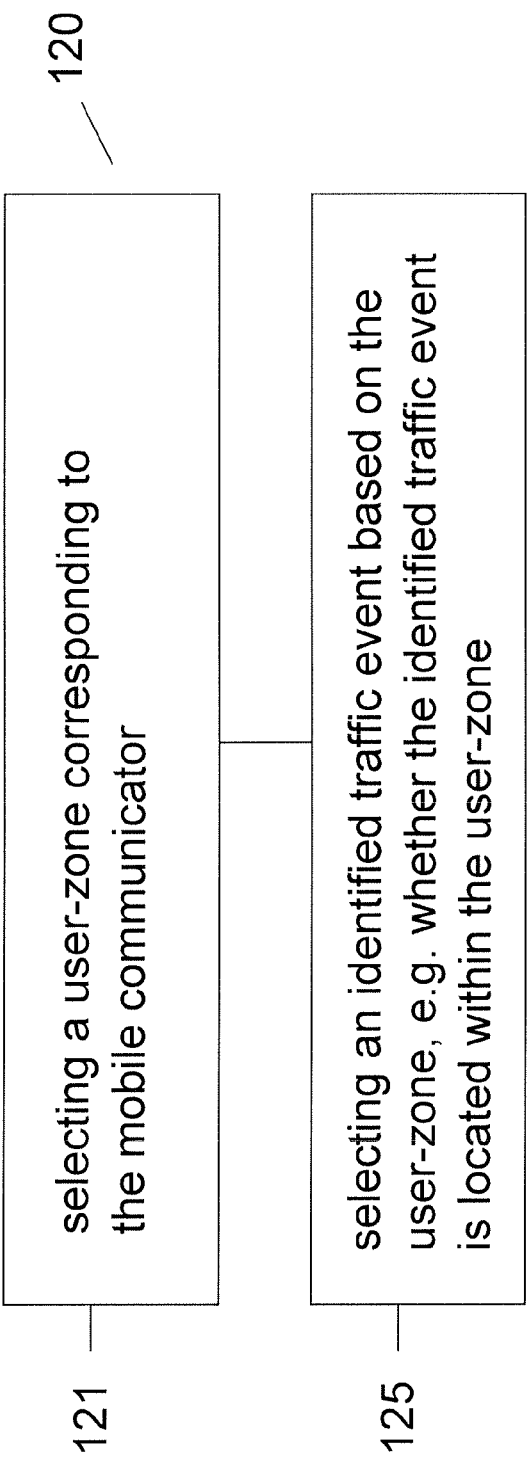
FIG. 3 illustrates the sub-steps 121-125 of the selecting a traffic event step 120.

FIG. 3 illustrates step 120, which involves selecting one of the identified traffic events. Step 120 may start with step 121: selecting a user-zone corresponding to the mobile communicator. The user-zone can be selected for various reasons. One of these reasons is to provide personalized traffic information. Selecting a user-zone around the mobile communicator identifies which road's traffic information is needed or requested by the mobile communicator. The user-zone can be selected by the TSP, e.g. as a default, or to represent a choice of the mobile communicator. In the latter embodiment, the mobile communicator may be prompted to choose a user-zone and then relay the choice to the TSP.

FIG. 4 illustrates that step 121 may include step 122: determining a location of the mobile communicator from location data provided by mobile communication stations of a mobile communication network or from data provided by a global positioning system. Step 122 can be followed by step 123: selecting the user-zone as an area centered at the location of the mobile communicator with a shape and extent. In some applications, the user-zone can be a "bubble" around the mobile communicator: e.g. 10 mile ahead the vehicle and a half mile wide on each side of the highway. Any other shape and extent can be specified as well. The extent and shape of the user-zone corresponding to each cell phone can have default values. These default values can be reset on a webpage or through a setup process during a telephone-call. It can be also specified whether the center of the user-zones, or any other distinguishing coordinate, e.g. the focal point of an elliptic user-zone, should be chosen to track the location of the mobile communicator. The shape and extent and any other characteristic of the user-zone can be updated by the mobile communicator during regular operations. In other embodiments, the shape and extent is programmed to vary according to identified traffic events by various service providers.

In an example, if a mobile communicator is alerted in step 130 that a selected traffic event is ahead of him, then the mobile communicator may wish to decide which alternate route to take. For making the right decision the mobile communicator may desire information on whether any of the possible alternate routes has a traffic jam on it. To deliver an answer, the TRO or TSP may alter the user-zone to become much wider, once a traffic event in the original user-zone has been reported, since wider user-zones prompt receiving alerts about traffic events potentially blocking some of the alternate routes. In another embodiment, the extent of the user-zones is increased as a traffic jam increases, in order to allow the driver to take alternate routes before getting caught in the traffic jam. More generally, the user-zone may be increased by the TSP so as to enable the mobile communicator to make informed choices in a timely manner, typically to take alternate routes or to pull over for shopping until the traffic jam dissolves.

Step 122 may include determining the location of the mobile communicator from location data provided by mobile communication stations of a mobile communication network. The location of the mobile communicator can be extracted e.g. by a triangulation method on the data, collected from the cell phone towers. In other embodiments, the location of the mobile communicator can be extracted from data provided by a global positioning system or a related cell-phone GPS system.

The user-zone is typically moving with the vehicle of the mobile communicator and thus it is constantly updated. In some embodiments, the location of the mobile communicator is determined by at least partially relying on the speed of the mobile communicator. The speed can be inferred e.g. from cell phone tower data. In some embodiments, the user-zones of cell phone users within a section of a metropolitan area can be tracked by a cell phone service provider in regular intervals, collecting data from cell phone towers.

In some embodiments the data about the user-zones are forwarded by the cell phone service provider to a traffic reporting organization (TRO), or to a traffic service provider (TSP), who specializes in practicing the presently described passive alerting method 100. In these embodiments the TRO or TSP tracks the moving user-zones. In other embodiments, the operators of the cell phone towers or the cell phone service providers, or the GPS service provider tracks and updates the user-zones.

In step 125 in FIG. 3 the TRO or TSP, or any other of the listed operators, may select one of the identified traffic events by updating the moving tracked user-zones of moving mobile communicators and evaluate whether any one of the identified traffic events fall within the updated user-zones. Once an identified traffic event is found to fall within the user-zone of a mobile communicator, step 130 can be carried out e.g. by alerting the mobile communicator with a passive message about the selected traffic event.

As an example, a driver on her way home from the office may switch on her cell phone. The cell phone sends identifying signals to the cell towers. The cell phone service provider transmits information about the driver to a traffic service provider (TSP), including her location (step 122) and user-zone (step 123), which were either transmitted in the identifying phase or stored based on previous communications. The TSP processes the identifying signals and extracts the location of the driver and recalls her preprogrammed user-zone which is 8 miles ahead of the vehicle and half mile wide. As the driver drives on highway US 101, the TSP continuously updates the user-zone and evaluates whether there is a traffic event within her user-zone. At some time a new traffic accident occurs 20 miles ahead of the driver on US 101. Corresponding traffic data is received by the TSP and is identified as an accident, causing a 20 minutes delay following the steps 111-113. This brings the presently active traffic accidents in the greater metropolitan area to 12. However, the TSP does not burden the driver with information regarding all 12 accidents. Instead, only when the driver arrives within 8 miles of the newly identified traffic accident, the TSP selects the accident on US 101 out of the 12 active accidents. The TSP then sends a passive alert signal only to the driver whose user-zone just overlapped with the identified traffic event that a traffic accident lies ahead, causing a 20 minutes delay. Since the driver knows that the size of her user-zone was set to 8 miles, this alert signal lets the driver know not only the existence of the traffic accident but its approximate distance from the vehicle and the probable delay caused by it.

In other embodiments, the user-zone can be selected differently. For example, the user-zone can be selected based on any kind of mobile communicator information. Embodiments include selecting a user-zone based on an address, such as the home of the mobile communicator. This choice lets the mobile communicator know whether there are traffic problems around her home, to assist her in planning the fastest route home.

In yet other embodiments, the user-zone can be based on another person. For example, the user-zone can be defined according to the location of the cell phone of the mobile communicator's spouse, family member, co-worker or business partner. These embodiments allow the mobile communicators to be informed e.g. whether a spouse or a business partner will be late for a meeting because of traffic delays.

In yet another embodiment, the TSP can modify the size of the user-zone based on the traffic event. For example, even if a driver selected only a 5 miles user-zone, but if the accident caused a 7 miles traffic jam, the TSP may override the user selection and reset the extent of the user-zone to 7 or even 8 miles. This allows the driver to become informed about the traffic jam before actually reaching it.

FIGS. 5A-E illustrate certain features of the above method 100.

FIG. 5A illustrates that the location of the driver (the diamond label) is determined in step 122*a*, e.g. from cell-tower data or GPS information. A user-zone is selected in step 123*a*, either defined during the initialization or recalled from stored data. As the driver moves, her location and the user zone are updated in regular intervals. The TSP received traffic information about various locations in the area. By practicing steps 111-113 the TSP identified two traffic accidents in the area, 125*a* and 125*ax*. These traffic events were identified through steps 111-113 by employees of the TSP integrating chopper data and cell tower data. However, the driver is not burdened and her radio program is not interrupted by information about these identified traffic events, as neither of these identified traffic events is selected, as they are both outside the driver's user-zone.

FIG. 5B illustrates the changed situation, when the most recent update of the driver's location 122*b* and her user zone 123*b* makes the identified traffic event 125*b* to fall within the updated user zone 123*b*. In an embodiment of step 120, the TSP selects the identified traffic event 125*b* based on the updated user-zone of the mobile communicator. With little or no delay the TSP carries out step 130 and alerts this specific driver to the traffic event 125*b* ahead of her. The alert is passive and does not require the driver to launch an application on her mobile communication device. In the same alert the TSP does not inform the driver about the identified traffic event 125*bx*, as that does not fall within the user's updated user-zone 123*b*.

Figure 5C:
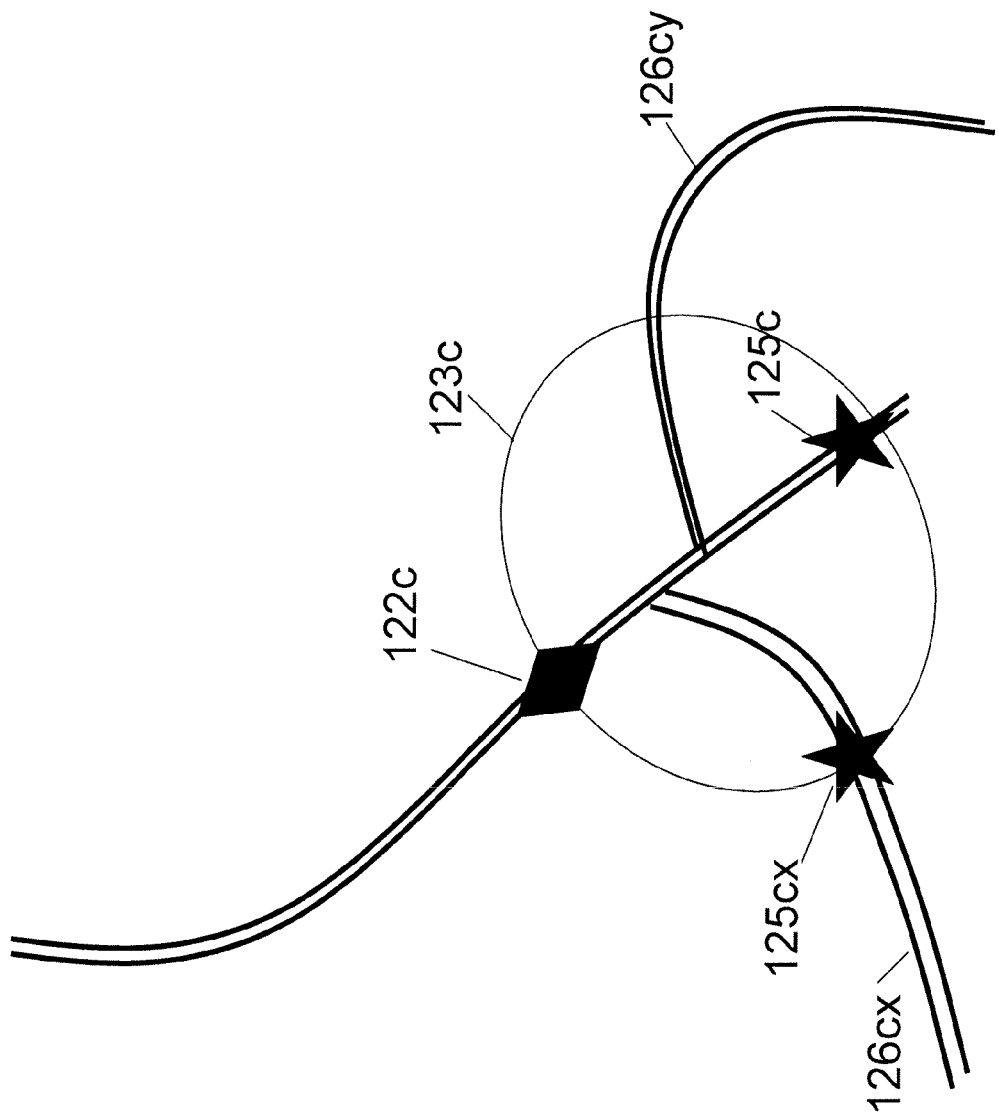
FIGS. 5A-N illustrate various situations and embodiments involving the user-zone, the event-zone and the traffic-event.

FIG. 5C illustrates that in relation to the identified traffic event 125*c* either the TSP or the driver changed the shape and extent of the user-zone in step 123*c*. Motivations to enlarge the user-zone include exploring the status of alternate routes. Since enlarging the user-zone made the identified traffic event 125*cx* also fall into the user-zone, the TSP also selects identified traffic event 125*cx*. Then, in a step 130, the TSP alerts the driver to selected traffic event 125*c* and 125*cx*. The alert may indicate that not only the main highway 101 has a traffic accident, but the first choice alternate route 126*cx* also has an accident 125*cx*. This alert may allow the driver to choose secondary alternate route 126*cy*, where accidents do not slow down traffic.

Figure 5E:
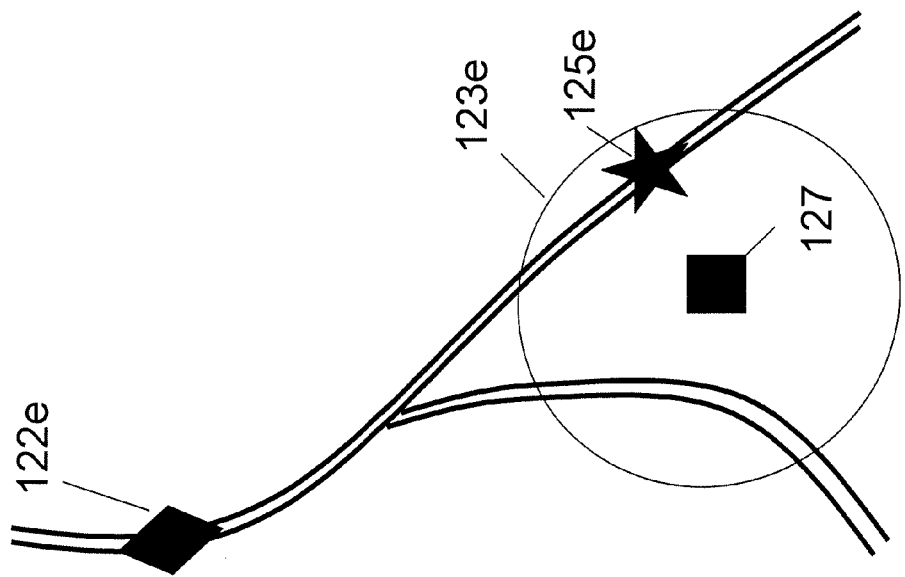
Figure 5D:
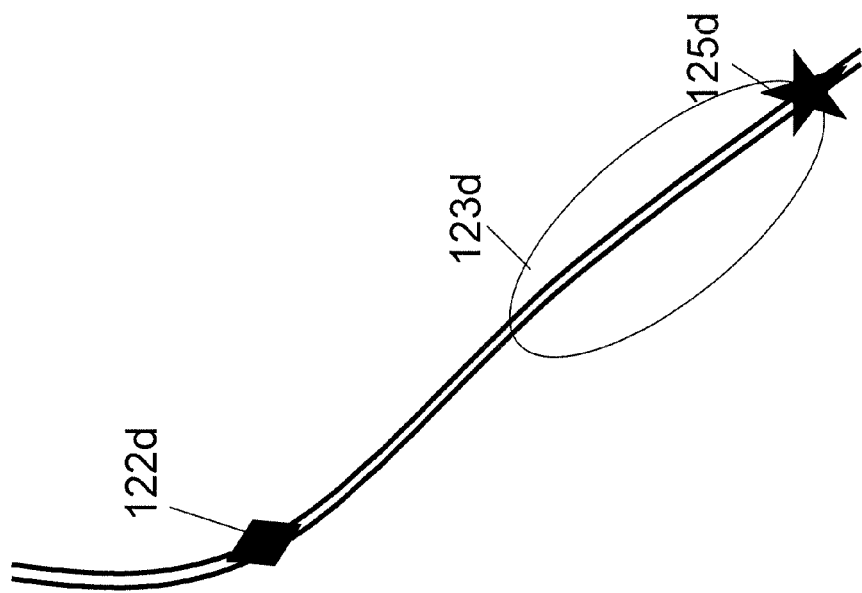

FIG. 5D illustrates another embodiment, where in the step 123*d* the user-zone is selected based not on the location of the driver but based on the location of the traffic event 125*d*.

FIG. 5E illustrates an embodiment where the user-zone is selected in step 123*e* based on the location of a selected house, such as the driver's home, or the school of the driver's children.

FIG. 5F illustrates an embodiment, where the TSP defines not only a user-zone 123*f*, but also an event-zone 127*f*. In these embodiments, the identified traffic event is selected for a particular mobile communicator, when the user-zone 123*g* of the mobile communicator overlaps with the event-zone 127*g* of the identified traffic event, as shown in FIG. 5G.

Figure 5I:
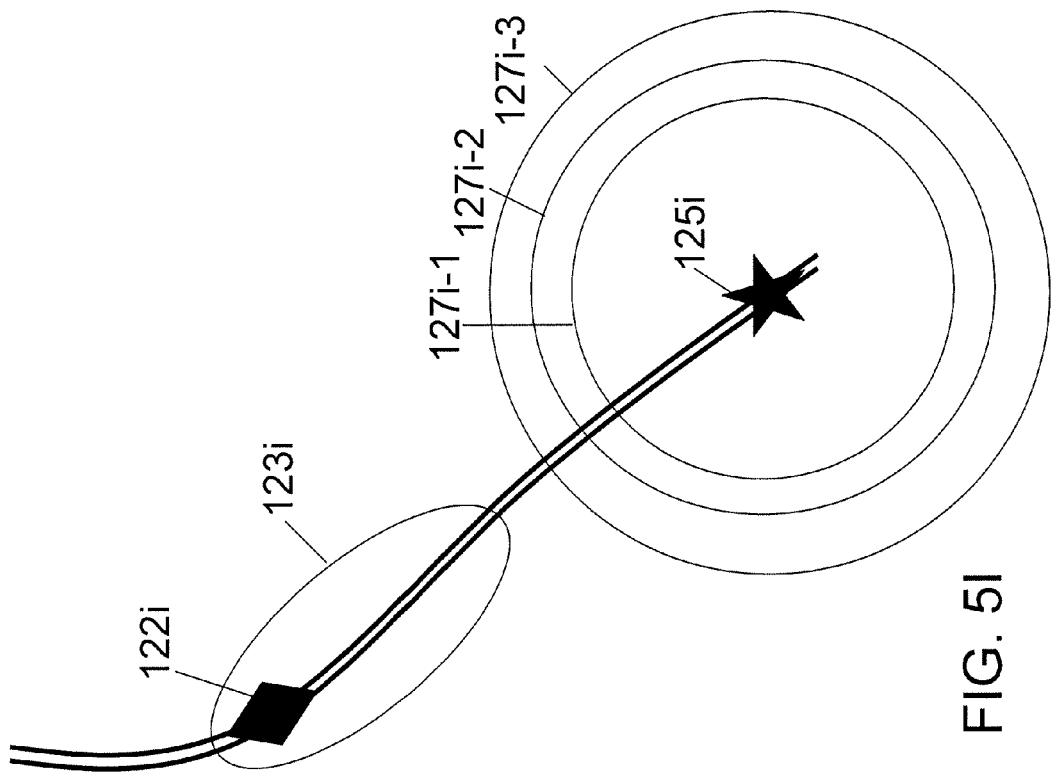
Figure 5H:
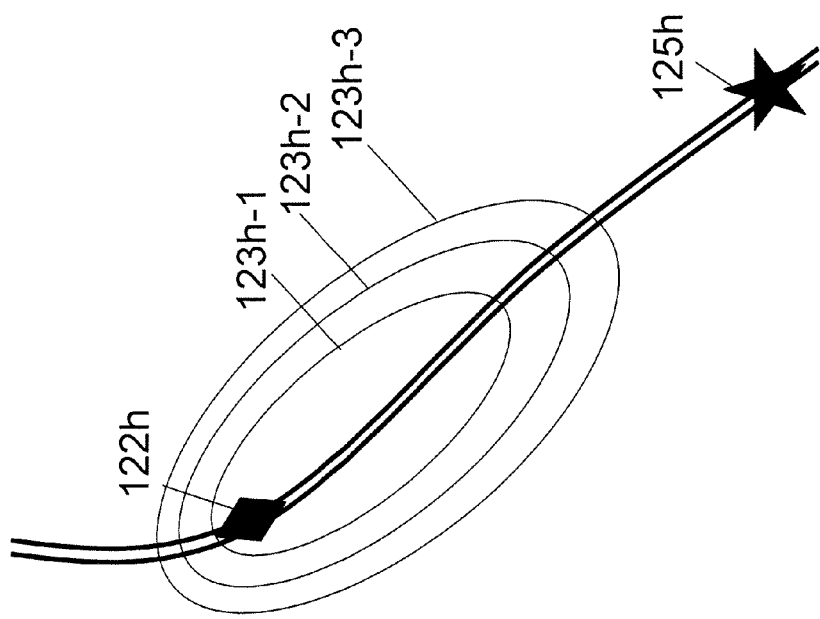

FIG. 5H illustrates that the user zone 123*h* can have a hierarchical structure, including hierarchical layers 123*h*-1, 123*h*-2, and 123*h*-3. In embodiments described below, different type of services can be provided to the mobile communicator as the identified traffic event 125*h* falls within different hierarchical layers 123*i*.

FIG. 5I illustrates that in some embodiments the event-zone may have a hierarchical structure, including hierarchical zones 127*i*-1, 127*i*-2, and 127*i*-3. In these embodiments, the mobile communicator may be offered different services as the user-zone 123*i* overlaps with different hierarchical zones 127*i* as will be described below.

FIG. 5J illustrates that in some embodiments the extent and shape of the user zone can be varied in time, depending on changing traffic conditions. For example, the user-zone can be shrunk from 123*j*-1 to 123*j*-2 when an overturned truck is removed and thus the TSP expects that the delays will be reduced.

FIG. 5K illustrates that in some embodiments the extent and shape of the event zone can be varied in time, depending on changing traffic conditions. For example, the event-zone 127*k*-1 can be extended to 127*k*-2, when the original accident is followed up by a chemical substance spill and thus the TSP expects that the delays will be increased.

FIG. 5L, illustrates that in some embodiments the user and event zones can be defined in terms of stations of a communication system. A particular embodiment defines the zones in terms of the towers of a cell-phone network: T1, T2, . . . . In particular, the user zones 123*l*-1 and 123*l*-2 can be determined in terms of the communication towers keeping track the identification numbers (ID's) of the mobile communicators, such as cell phone users. In FIG. 5L the mobile communicator communicates with tower T4, thus the user-zone 123*l*-1 of the mobile communicator 122*l*-1 gets defined as an area corresponding to tower T4, and the user zone 123*l*-2 of the mobile communicator 122*l*-2 gets defined as an area corresponding to the tower this mobile communicator is communicating with: T3.

The traffic event, or incident, 125*l* happened between towers T1 and T2. The event-zone 127*l* is defined as an area corresponding to towers T1 and T2. Visibly, in the illustrated situation the user-zone 123*l*-1 of mobile communicator 122*l*-1 does not overlap with the event-zone 127*l*, and thus mobile communicator 122*l*-1 does not get alerted in step 130. In contrast, the user-zone 123*l*-2 of mobile communicator 122*l*-2 does overlap with the event zone 127*l* and therefore mobile communicator 122*l*-2 gets alerted in a step 130.

In some cases, the event-zone is elongated along the highway itself. The event zone 127*l* can be asymmetric, i.e. longer for the direction of mobile communicators approaching the traffic incident 125*l* and shorter for mobile communicators leaving the area of the traffic incident 125*l*.

The direction of motion of mobile communicators can be determined from acquiring tower data repeatedly. For example, at a time t the TSP, or any other agent, may acquire the data that on a north-south oriented road, a mobile communicator contacted a tower Tn. Then, at a subsequent time t', the TSP/agent may record that the same mobile communicator contacted a second tower Tm, which is located south from tower Tn. From these data the TSP/agent may infer that the mobile communicator is moving southward along the road. As explained above, the TSP may use this directional information to define the event zone 127*l*.

FIG. 5M illustrates an embodiment when the event-zone 127*m*-1 gets extended from 127*m*-1 to 127*m*-2. Visibly, the tower-defined user-zone 123*m*-1 does not overlap with event-zone 127*m*-1 and thus mobile communicator 122*m*-1 does not get alerted when the event-zone is the original smaller size 127m-1. In this case only mobile communicator 122m-2 gets alerted.

However, it the TSP, or any other agent, re-evaluates the severity of the traffic incident, or the traffic jam builds up, then the TSP may decide to increase the tower-defined event zone from 127m-1 to 127m-2. In this case the mobile communicator 122m-1 also gets alerted in an alerting step 130.

Figure 5N:
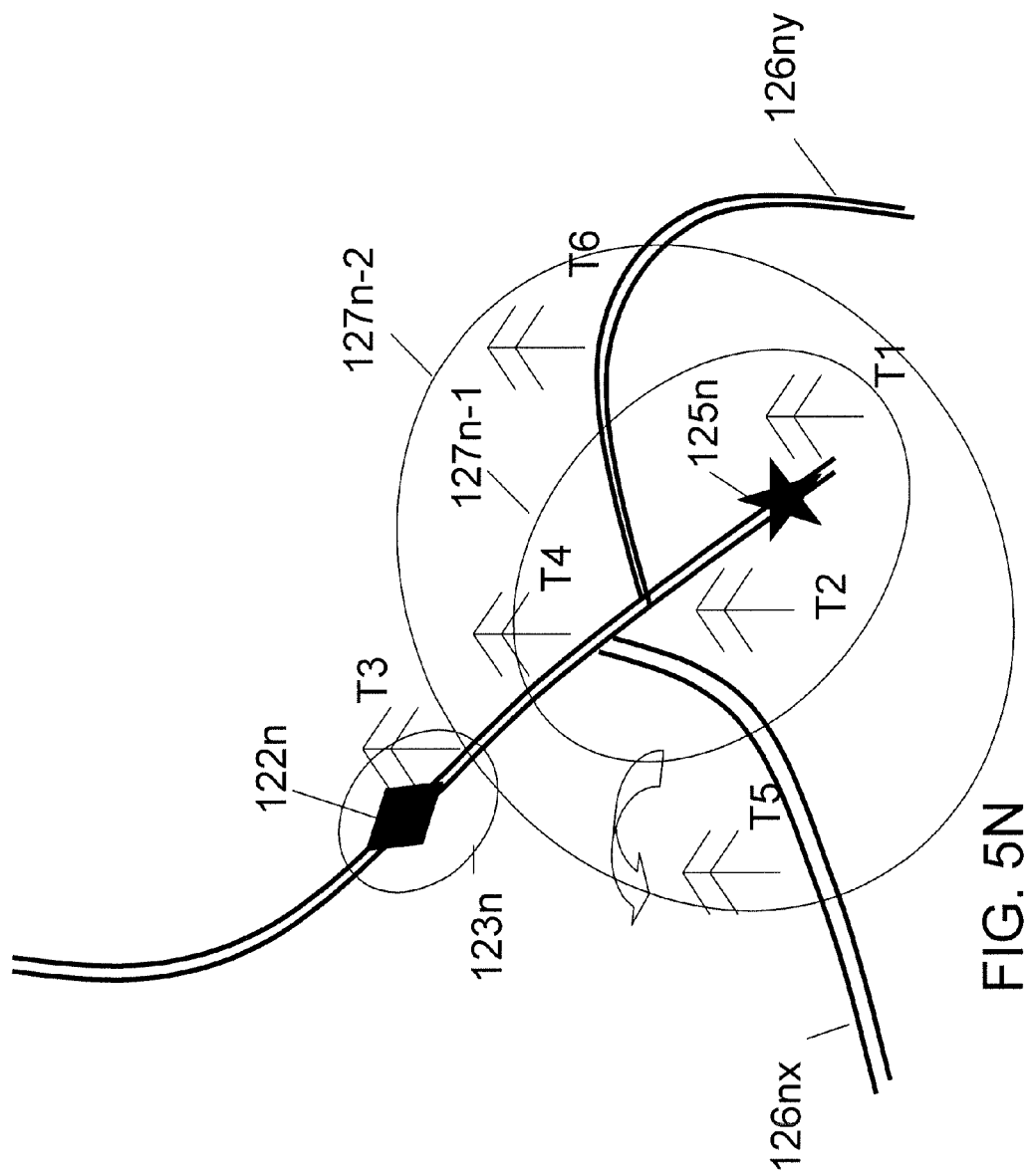

FIG. 5N illustrates another embodiment of enlarging the event-zone 127n-1 to 127n-2. Mobile communicator 122n has a tower-defined user-zone 123n, defined essentially as an area belonging to tower T3. A traffic event or incident 125n was identified between towers T1 and T2. At the early stages of the incident, there was only a limited buildup of traffic jam, thus the event-zone was defined as 127n-1, which impacted only towers T1, T2 and T4. At this stage only mobile communicators, whose user-zones 123n overlap with the event-zone 127n-1, will receive alerts. In embodiments, where the user-zone is defined by towers, the mobile communicators who are communicating through towers T1, T2 and T4, will be alerted. Accordingly, mobile communicator 122n is not alerted at this stage.

However, at a subsequent time the traffic service provider TSP may integrate updated traffic information, e.g. by carrying out steps 111-113, and conclude that the size of the traffic jam expanded onto subsidiary routes 126nx and 126ny. In order to alert mobile communicators on those roads, as well as helping approaching mobile communicators, who maybe contemplating taking these subsidiary routes, the service provider may decide to extend the event-zone into 127n-2. As the FIG. 5N illustrates, the enlarged event-zone 127n-2 may include towers T3, T5 and T6. In tower-defined user-zones this means that the mobile communicators who are communicating through these towers, will be alerted. According to FIG. 5N, user 122n will be alerted after the enlargement of the event-zone to 127n-2.

In various embodiments this enlargement procedure may take forms. E.g. the event zone may be constructed not as a single ellipse, but as a collection of elongated areas, formed along the main route and the subsidiary routes. These elongated areas can be updated, modified and varied independently from each other.

Also, the enlargement step can be repeated more than once, involving more and more towers. Further, as the traffic jam gets resolved, e.g. the overturned truck gets removed at 125n, the event-zone maybe reduced as well. Again, this can be done as an overall reduction, or piece-wise. Also, different towers may send out different alerts, as motorists may face different traffic conditions ahead on the main road and on the subsidiary roads.

Alternatively, the TSP may define an increasing event-zone around the traffic event. In these embodiments In step 122, the location of the mobile communicator can be determined passively, i.e. without running an application on the mobile communication device.

In step 120, the traffic event can be selected without requiring the mobile communicator to specify or program a traffic route. This is in contrast to some systems, which pair drivers and traffic accidents based on the drivers entering their daily commute (or any other route of interest) onto a web-based system.

In step 130 the alert message is sent out passively. Embodiments of this step include alerting the mobile communicator without requiring the mobile communicator to respond by using hands, e.g. to terminate or interrupt an active application. This embodiment may be appreciated in countries or states where operating mobile phones with hand during driving is prohibited. Also, some systems require the driver to launch an application either to indicate their location to the TSP, or to respond to or process the traffic information, such as displaying a map, which shows the blocked highways. This requires interrupting e.g. ongoing telephone conversations: a disadvantageous feature.

The mobile communication device can be any known mobile communication device, including a mobile telephone, a mobile computer, and an electronic device configured to operate in conjunction with a mobile communication network.

In step 130 the alerting may take place on a separate telephone line, if the mobile phone is configured to operate two or more phone lines.

The alerting step 130 may include alerting the mobile communicator with an alert-message, which includes at least one of an audio component, a text component, an SMS, a video component, a radio broadcast component, a television broadcast component, a multimedia component, and a multimedia messaging service component.

An example for an alert message is an audio component, which includes a ring-tone, an instruction to tune to a traffic radio and a video component including a live traffic camera broadcast.

In some embodiments, in step 130 the alert-message component can be selected based on a location of the mobile communicator relative to the selected traffic event, followed by alerting the mobile communicator with the alert-message component. Examples include providing more detailed information as the driver gets closer to the accident. Embodiments include providing first just a statement of the traffic accident, then, upon the driver getting closer to the accident site: the total time delay, then on further approach: which alternate routes to take to avoid the traffic jam, or which frequency to tune the car-radio for additional information.

In this sense, the user-zone can be viewed as having a hierarchical structure itself: more detailed information is delivered to the mobile communicator when the identified traffic event moves from an outer layer of the user-zone to an inner layer of the user-zone. As mentioned before, in some embodiments the extent and shape of the user-zone may be updated by the TSP, e.g. motivated by the increasing extent of the traffic jam. In these embodiments, if the user-zone is enlarged by the TSP, the identified traffic event can move into an inner-layer of the user-zone from an outer layer even if the mobile communicator is sitting in a traffic jam.

Alternatively, the TSP may define an increasing event-zone around the traffic event. In these embodiments These examples were specific realizations of "traffic utility information" regarding the selected traffic event. Other embodiments of the traffic utility information include information regarding an alternative route related to the traffic event, an expected duration of the traffic event, predicted times of arrival to points of interest, such as to a concert or to an airport, a parking information, an event information, and a suitable exit near the mobile communicator's location.

The parking information can include the location of a parking garage and whether that garage has empty slots or is it full. Combined exit and parking information can be especially useful near airports, concerts, or sporting events, where different auxiliary parking lots can be approached through different exits, and the parking lots can fill up, inconveniencing drivers.

In some embodiments, the traffic information is updated in a regular manner, e.g. when a prediction of a traffic delay is changed, or an overturned truck has been moved to the side. This provides the mobile communicator with valuable information for making decisions.

The traffic utility information can be offered in response to the mobile communicator requesting more information, or can be offered by automatically launching an application on the mobile communication device.

The traffic utility information can be offered as part of an advertisement-based non-paying service, or as part of a paying service. The paying service may include a monthly fee based service, a per-use service, and a service, billed in relation to the bill of the mobile communication service.

Providing a traffic alert and traffic utility information in relation to the location of a driver is a specific example of "location based services", sometimes referred to as LBS.

Embodiments of the present alerting method can be viewed as "pushing" information to the drivers: a distinction from some existing methods, where the drivers have to "pull" information from a service provider. As such, the present method offers commercial opportunities to interested sponsors.

Figure 6:
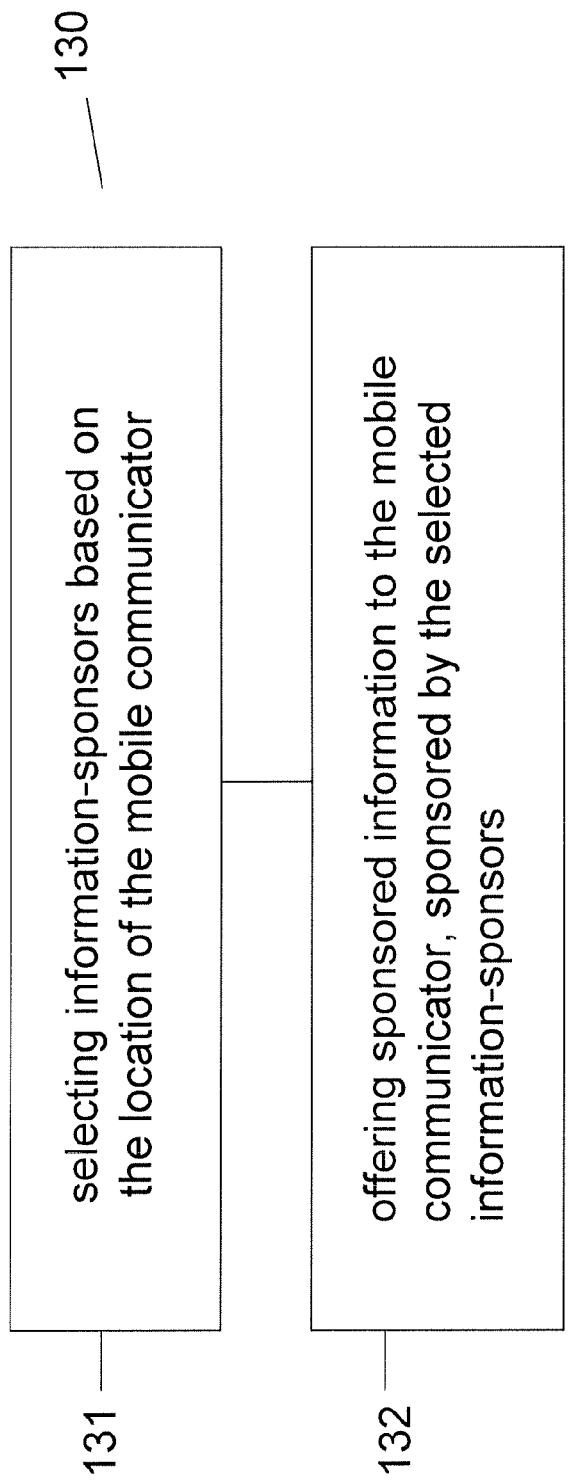
FIG. 6 illustrates the steps 131-132 of generating sponsored alert messages step 130.

FIG. 6 illustrates that the alert message in step 130 may contain sponsored information from interested sponsors. Within step 130, in step 131 information-sponsors can be selected based on the location of the mobile communicator, and in step 132, sponsored information can be offered to the mobile communicator, sponsored by the selected sponsors. Notably, the sponsored information may include advertisements.

For example, when the TSP determined that the mobile communicator, whose location was tracked in step 122, is facing substantial traffic delays in the vicinity of exit 42, the TSP may carry out a search in an internal database of ad-sponsors in a vicinity of exit 42, and then offer advertisements and promotions by these sponsors on the cell phone of the mobile communicator, as described in more detail below.

Figure 7:
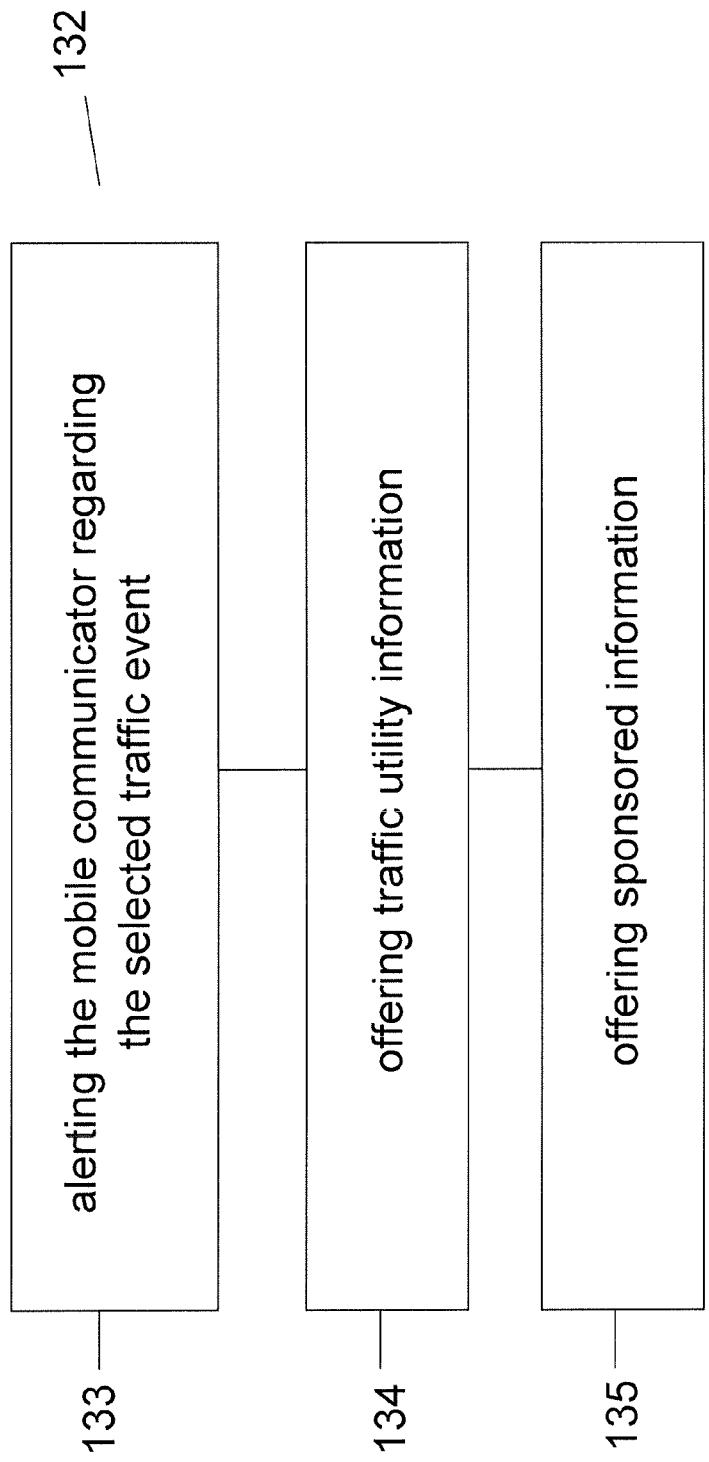
FIG. 7 illustrates a hierarchy of alert messages 133-135.

FIG. 7 illustrates that sponsored information can be offered in a hierarchical manner within step 132. Embodiments include: (step 133) alerting the mobile communicator regarding the selected traffic event, (step 134) offering traffic utility information, and (135) offering sponsored information, such as an advertisement.

The hierarchical information may be offered in hierarchical formats, or hierarchical components. These hierarchical components may include: an audio component, a text component, an SMS, a video component, a radio broadcast component, a television broadcast component, a multimedia component, and a multimedia messaging service component.

The hierarchical information may be offered in conjunction with the hierarchical structure of the user-zone or the event-zone embodiments of FIGS. 5H-I. In some embodiments, a simple ring-tone is sent when the mobile communicator enters the outermost hierarchical event-layer 127$i$-1. Subsequently, when the mobile communicator enters the next hierarchical event-layer 127$i$-2, a text message is sent to the mobile communicator's cell phone. Finally, when the mobile communicator enters hierarchical event-layer 127$i$-3, an application is launched automatically on the cell phone to rely more in-depth traffic information.

The video/television/media information in general, and the advertisements in particular, may be offered in streaming format, in download-and-play format, and in any other kind of audio-visual format.

Embodiments include the TSP generating a passive audio alert message for the driver by generating a modified ring tone on the driver's cell phone with an announcement that an accident lies ahead, and advising to take near-located exit 100. Alternatively, the modified ring tone may only alert the driver to the selected traffic event ahead, and a text message sent to the phone of the driver may display the expected delay or other relevant traffic information.

Once the driver takes exit 100 and opens the cell phone for further information, an application may launch automatically, or the driver may be invited to launch the application (step 133). Once the application is launched, it may present additional traffic utility information, such as a live video feed from a traffic helicopter, showing the accident site, or a web-based map, highlighting the delayed routes, including the actual estimated delay times for the main route and the primary alternative routes, and possibly identifying non-delayed alternative routes (step 134). This can be followed by step 135, where sponsored information is offered as e.g. web-based advertisements, or direct single-cast of an advertisement to the cell phone of the driver. The ads can also be placed on the screen simultaneously with the traffic utility information.

Examples of sponsored information include the ads of the restaurant, located near exit 100. Or the announcement of ongoing sales at the neighboring department store. Or a promotion (such as a price reduction) announced by a nearby gas station. The knowledge of the time delay will assist the driver to decide which promotional offer to accept at the nearest exit 100. The driver may prefer utilizing the service to avoid sitting in traffic for an inordinate amount of time, and instead using the time of the traffic jam for some overdue shopping.

In some embodiments, once the mobile communicator launches an application on his or her cell phone, the TSP may make part of this application to relay individual location information back to the TSP. In these embodiments, the TSP receives one more type of traffic information: the individual speed of the mobile communicator, beyond the average speed information, available from the cell-towers. This individual information can then be one of the collected traffic information used in step 111.

Some embodiments of the passive traffic alerting method 100 can be supported by the sponsors of the advertisements. As such, some embodiments can be offered without charge, in contrast to many present, fee-based services.

Mixed embodiments are also possible. In some cases the basic passive traffic alert may be offered free of charge, but additional components of the hierarchical messages may be fee based. For example, the more detailed traffic utility information may be provided for a fee, when the driver launches an application on his cell phone. Or, if the driver accepts an invitation for a promotional event, such as a sale in a nearby department store, then the traffic utility information may be offered free of charge.

Many forms of invitations can be implemented within the method 100. For example, a sponsor may offer a coupon to the driver in an electronic format. A particular implementation is that the coupon contains a bar coded portion attached to the invitation. Thus, the driver can take advantage of the invitation by driving to the offering department store, purchase the offered item, and during check-out swipe her cell phone with the stored bar code on its display over the laser scanner of the checkout counter.

Many other promotional items can be offered electronically, e.g. the tickets of a nearby sports game or of an entertainment event. In some embodiments, the ticket itself, possibly with a bar code or with any other identifying mark, can be sent electronically to the cell phone of the driver. Any one of these electronic promotional items, such as barcodes, can offer free products or services, or partial credit toward a full price.

In some other embodiments the promotional items may offer delayed access, e.g. the sponsoring department store may offer a coupon, which is valid for a multi-day period. Or, if a department store learns that at a future time there will be a traffic jam nearby, e.g. because of a construction of an overpass, then the department store may transmit to the driver coupons and barcodes which are valid at the future time of the traffic jam.

Some embodiments include "location-awareness" components. For example, on a highway leading from California to Nevada, a traffic accident occurs. The TSP determines the location of the mobile communicator e.g. from the data provided by the cell-phone service provider. If it is determined that the mobile communicator crossed the state-line and is in Nevada already, then not only promotional messages of local stores can be forwarded to her cell phone, but also gaming offers, e.g. bets which can be placed through the cell phone.

Some embodiments include various control mechanisms regarding the ring-tone overriding function. To avoid enabling or even allowing the creation of undesirable ring-tone overrides, various oversight functions can be implemented.

Figure 8:
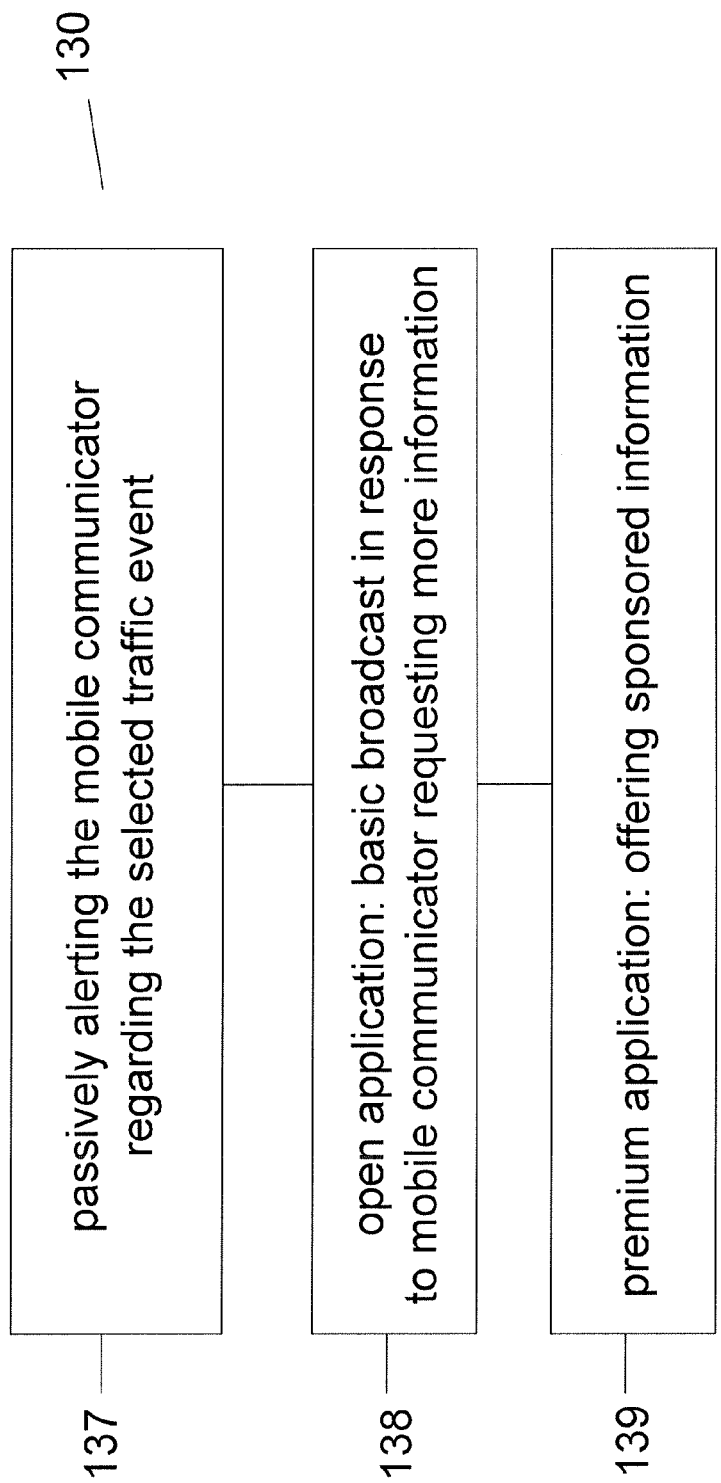
FIG. 8 illustrates a multi-level messaging embodiment.

FIG. 8 illustrates an embodiment of messaging the mobile communicator. The TSP can alert the mobile communicator with a passive alert message regarding the selected traffic event in step 137.

Then, in an open application, the TSP can provide basic broadcast information in response to the mobile communicator requesting more information in step 138.

Finally, in a premium application, sponsored information can be provided to the mobile communicator in step 139. The sponsored information can be of any variety described within this application, including in-depth traffic information, location based services, such as parking information, sales-related information, event information, promotional offers.

In some embodiments mobile communicators can program their interests through their cell phones, or through any other electronic communication device, such as their computer, specifying the type of promotional offers they more interested in receiving, or whether they are interested in getting alerted about other routes, such as their family member commute routes.

In some embodiments the delayed mobile communicator may be invited to specify third party alerts, e.g. the TSP may offer alerting a family member or a co-worker of the delayed mobile communicator.

In some embodiments, the mobile communicator is enabled to interact with the mobile communication device via voice commands. Embodiments include ordering the mobile phone to launch a traffic-related application, or to modify the user-zone, or to notify a third party about the delay the mobile communicator is experiencing.

In some embodiments the TSP responds to the mobile communicator's requests by an Interactive Voice Response (IVR) system. For example, the ring tone may alert a driver of a traffic event ahead. In response, the driver may call a pre-programmed number, preferably by a single click on the phone. From this number, the driver may be provided further information regarding the traffic event.

Figure 9:
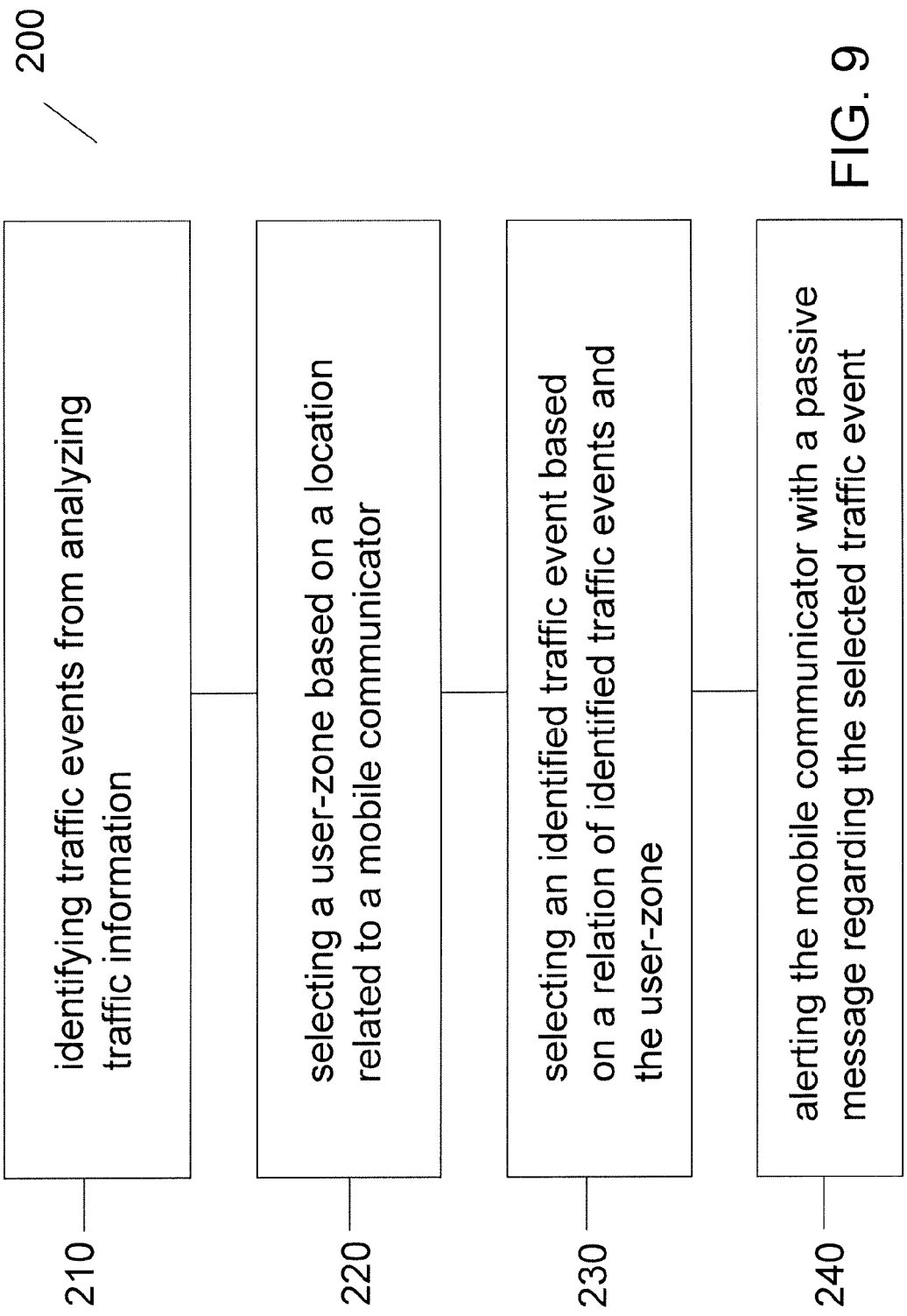
FIG. 9 illustrates an alternative embodiment 200.

FIG. 9 illustrates a related traffic alerting method 200, including the steps identifying traffic events from analyzing traffic information (step 210), selecting a user-zone based on a location related to a mobile communicator (step 220), selecting an identified traffic event based on a relation of identified traffic events and the user-zone (step 230), and alerting the mobile communicator with a passive message regarding the selected event (step 240).

Figure 10:
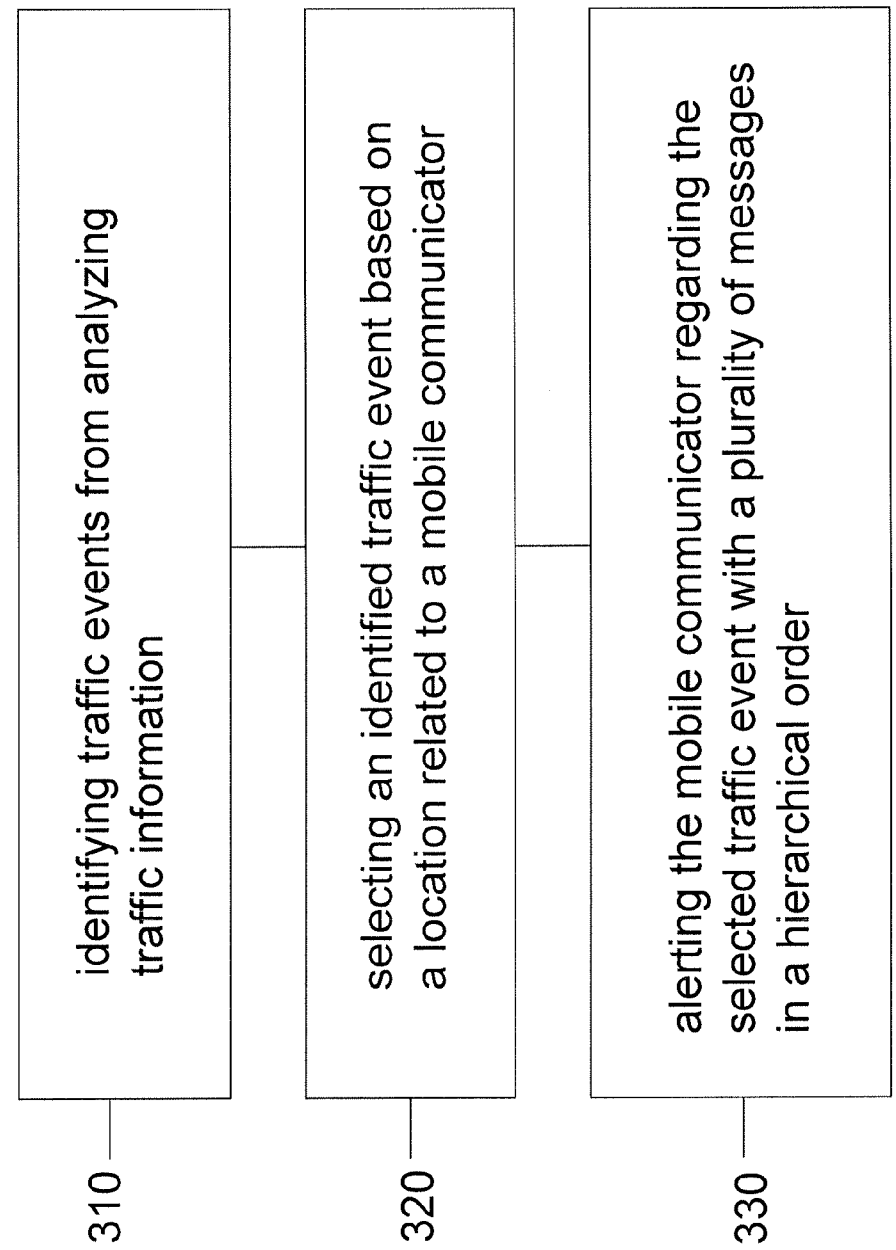
FIG. 10 illustrates another alternative embodiment 300.

FIG. 10 illustrates a related traffic alerting method 300. Method 300 includes identifying traffic events from analyzing traffic information (step 310), selecting an identified traffic event based on a location related to a mobile communicator (step 320), and alerting the mobile communicator regarding the selected traffic event with a plurality of messages in a hierarchical order (step 330).

Figure 11:
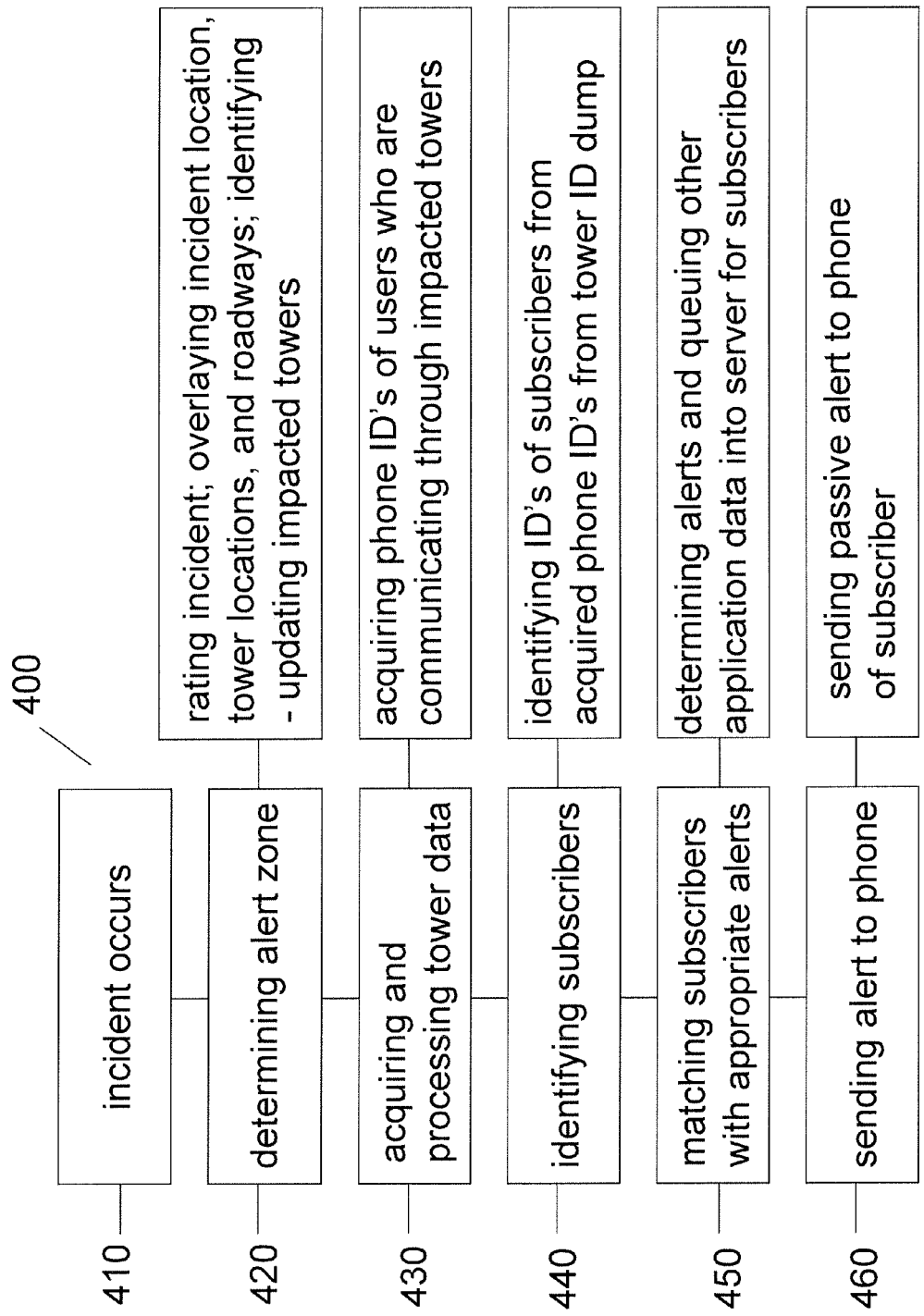
FIG. 11 illustrates an alert message generation method 400.

FIG. 11 illustrates embodiment 400 of a traffic alerting method. In particular, FIG. 11 shows the generating of the alert message in detail. In this embodiment, once the traffic event or incident occurs (410), in step 420 a determining of the alert zone gets carried out. An operator, agent, or traffic service provider, may first rate the incident data: how serious is the incident, how long delays can be expected. The ratings can be based on multiple factors, including video, helicopter, police, sensor, remote camera and other types of data. The rating of the traffic incident can be identified by carrying out earlier-described step 110.

Then the operator or agent can overlay three types of maps: a location of the incident, the map of cell phone towers, and the roadmap. From the overlaying of these three maps the operator or agent can identify the alert zone, or event zone. In this embodiment the alert/event zone can be identified in terms of mobile communication stations, such as cell phone towers. The towers which are within the alert zone will be referred to as impacted cell phone towers. They include the towers in whose vicinity the traffic incident occurred, plus the towers along which a buildup of a traffic jam is either expected, or already observed. The extent of the alert/event zone can be updated repeatedly: it can be expanded or contracted as events on the ground evolve: expanded as the traffic jam builds up and contracted as the traffic obstacle gets removed.

In the same step 420 the service provider may determine the alert which corresponds to the incident. E.g. the nature of the traffic event/incident can be determined. Examples include: the alert may specify the duration of the delay, or the type of the accident (e.g. how many cars are involved, etc.)

In step 430, cell phone tower data can be acquired and processed. For example, the identification numbers, or IDs, of mobile communicators can be collected from the impacted cell phone towers. This will identify for the service provider all cell phone users within the alert zone. This acquisition may be referred to as tower ID dump.

In step 440, the subscribers can be filtered out from the ID'd cell phone users, whose ID was acquired from the impacted towers. This will enable the service provider with a list of users, or mobile communicators, who should be provided with service from the dumped IDs.

In step 450, matching of appropriate alert can be performed. In some cases this involves determining an appropriate alert. Embodiments can maintain control over applications which generate the alert message. These embodiments can avoid the generation of inappropriate messages, which can be an important consideration. This control function is sometimes referred to as a gateway function, or "gateway-ing".

In the same 450 step, other application data may be queued on the servers of the service provider. These data may include making further data available, as well as video, audio and other type of information, regarding e.g. the traffic incident. This step readies other information to provide full information application to the cell phone of the user.

In step 460 the composed appropriate message can be sent to the phone of the subscriber of the service. This message is typically a passive alert message.

Figure 12:
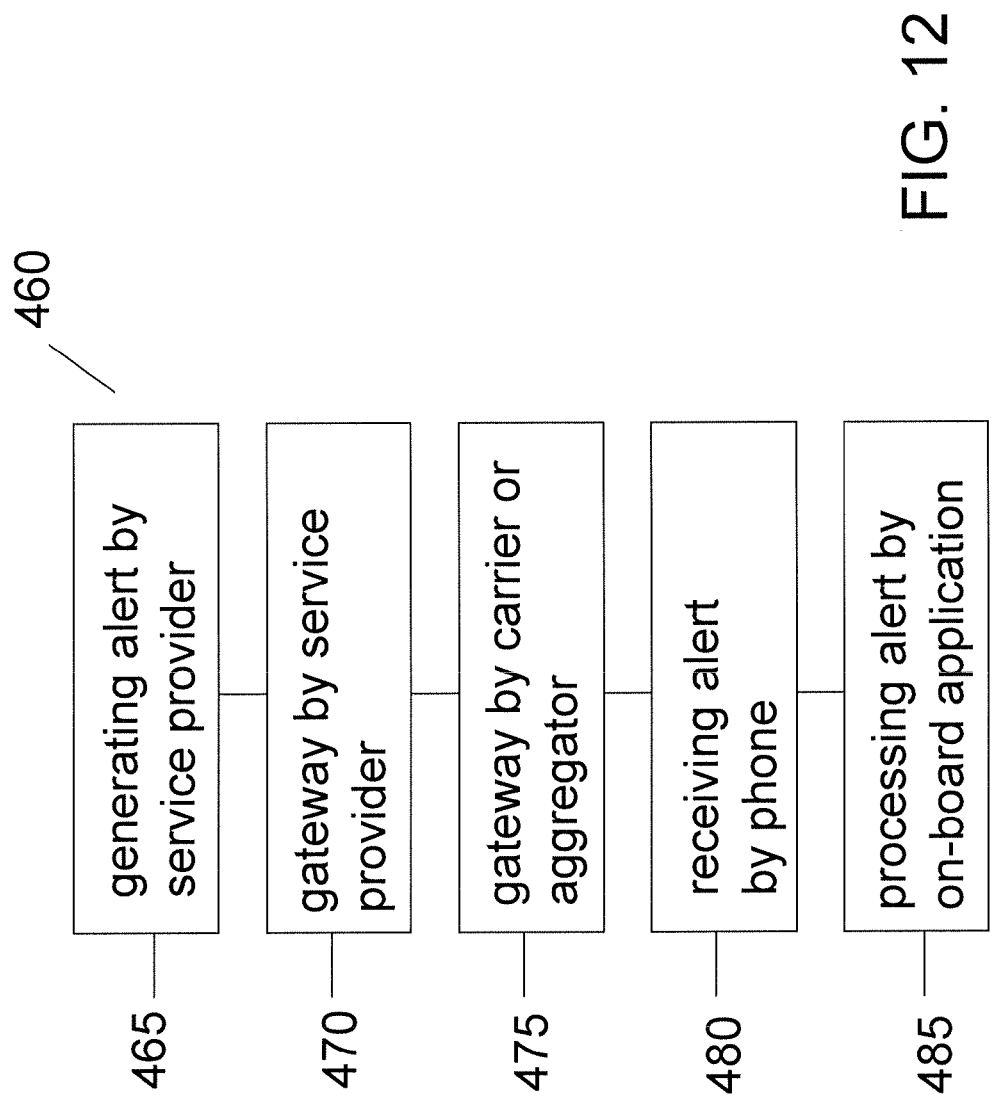
FIG. 12 illustrates an embodiment of the alert message transfer protocol.

FIG. 12 illustrates in more detail the path 460 of the alert message once it has been generated by the service provider.

In step 465 the alert message is generated, as described e.g. in steps 410-450 above and in steps 510-550 below.

In step 470 the service provider provides a gateway service. As indicated above, a purpose of this service is to prevent unauthorized users to generate inappropriate messages. In some embodiments the gateway service provides an authentication code associated with the alert message.

In step 475 the carrier, or aggregator also operates a gateway service. In some cases this carrier/aggregator gateway can search for the authentication sign from the service provider's gateway, and keep or discard the alert message depending on whether proper authentication has been identified.

In step 480 the mobile or cell phone of the individual subscriber or user may receive the alert message from the carrier.

In step 485 the alert message is actually processed by a client or application running on board of the cell phone of the subscriber or user.

Figure 13:
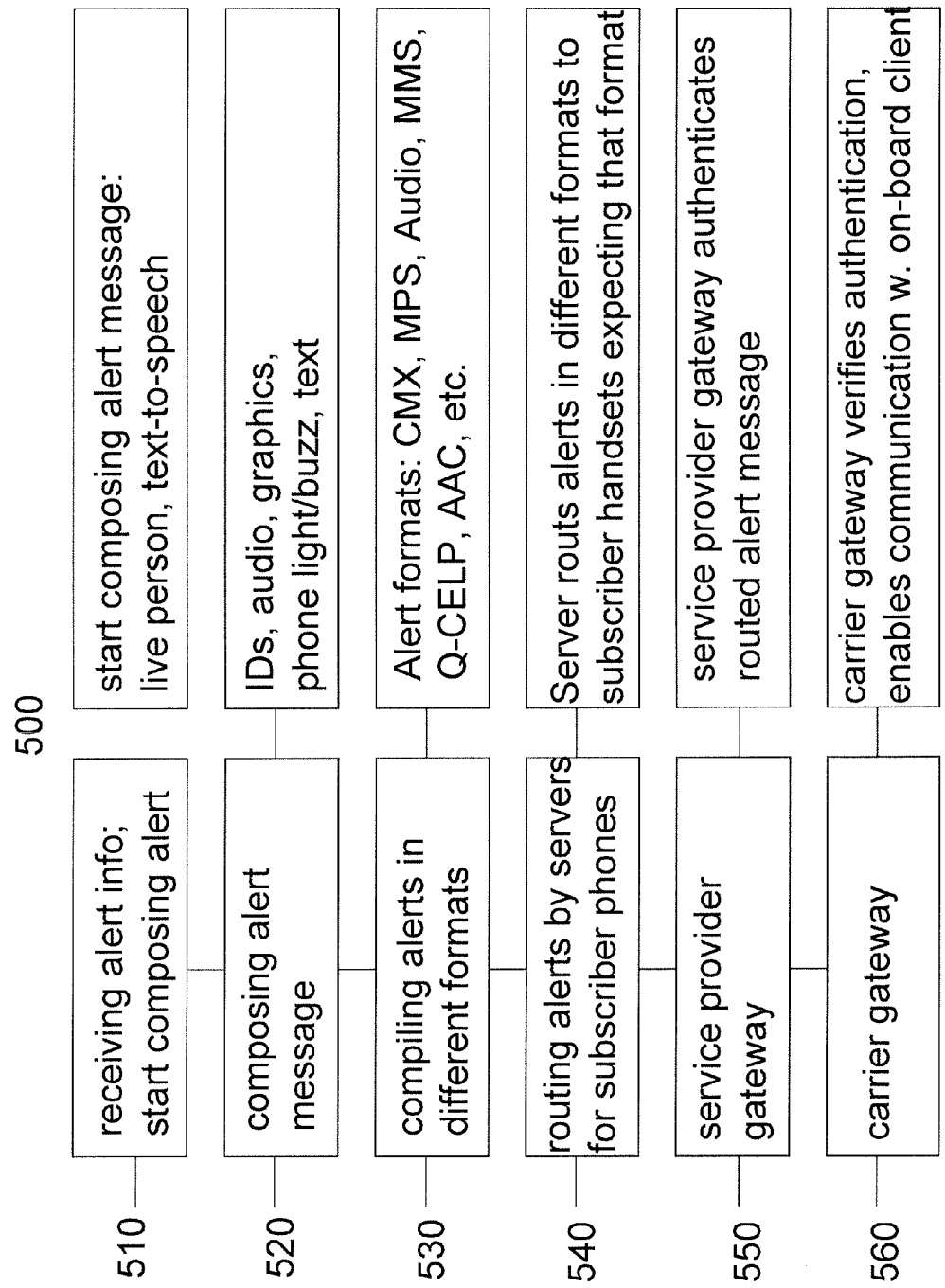
FIG. 13 illustrates an embodiment of the alert message generation method 500.

FIG. 13 illustrates another embodiment 500 of the method. Embodiment 500 shows in detail the generation of the content and format of the alert message.

In step 510, alert information is received by the system provider. In response, the system or service provider may start composing an alert message. In this first step, the alert message could be composed by a live person. This step can be performed in parallel to step 420, where the incident is rated. The live person may integrate information from various sources, including police reports, video feeds, cell tower data about the speed of passing motorists, sensors, cameras, etc. Then the live person may construct the alert message. This may involve composing a live message, or may involve text-to-speech conversion.

In step 520 the alert message can be composed. The alert message can involve an audio component, graphics, and various alert methods by the phone, such as buzzing, lighting up, vibrating, blinking, displaying text, or any other triggering. In some embodiments the phone may have a "talking telephone" application present, which makes the phone "talk" to the subscriber.

In step 530 the alert may be compiled. This may involve alert formats, including Qualcomm-CMX, MPS, Audio, Q-CELP, AAC and any other codecs for cell phones. It can also involve Multi Media Services (MMS), which can include audio, video, and text components. In some cases proprietary formats can be also utilized. This step maybe carried out in parallel with step 450 above.

In step 540 the server formats the alert message for the phones. In some embodiments the acquired and filtered IDs carry the handset profiles. These handset profiles carry information concerning the format the handset expects to receive its messages. Today about 2800 types of handsets are in use, and they require a wide variety of formats. These include the universal $3^{rd}$ generation standard 3gpp, Apple's AAC, MP3, png, jpeg formats and many other types of restrictions, such as maximum number of characters etc.

To accommodate this expectation, the servers may establish a large sorting mechanism. This includes a sorting table, which lists all the subscribers and their handset profiles. In step 530 the alert message has been compiled in all known formats. In sorting step 540 the server may rout the message in a particular format to all those handsets, whose profile indicates that they expect the message in this particular format. In simple terms, the server assigns the alert message in a specific format to those handsets which expect the message in that specific format.

In some embodiments, the subscriber may also specify additional preferences, such as at a given time he prefers to receive the alert only as a vibration but not as a voice alert. The handset profile may carry this information as well. In response, the server may rout an alert message to the subscriber, which is formatted accordingly, e.g. without the voice component.

This system is different from the system often used today, when the sorting system includes a large number of stacked dedicated servers, each specialized for formatting messages into a single format.

Step 550 illustrates the gateway function by the service provider, where the alert messages can be authenticated by a gateway.

Step 560 illustrates the gateway function by the carrier, which checks the authentication by the service gateway.

When finally the alert message reaches the phone, it will be processed by the on-board application, as e.g. in step 485 in FIG. 12. These mirroring gateways 550-560 allow for a safe communication between the service provider and the handset, and in particular the client on the handset, of the individual subscriber.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A passive traffic alerting method, comprising the steps of:
   identifying traffic events from analyzing traffic information;
   selecting an identified traffic event based on a location related to a mobile communicator and an event zone defined around the identified traffic event, the event zone defining a dynamic two dimensional shape around the identified traffic event; and
   alerting the mobile communicator with a passive message regarding the selected traffic event without prompting the mobile communicator to launch an application on a mobile communication device.

2. The method of claim 1, the analyzing the traffic related information comprising:
   collecting traffic information from a plurality of traffic data sources; and
   identifying a traffic event by integrating collected traffic information.

3. The method of claim 2, further comprising:
   creating a traffic-assessment by modeling traffic using collected traffic information; and
   identifying the traffic event by integrating collected traffic information and the traffic assessment.

4. The method of claim 1, the selecting an identified traffic event comprising
   selecting a user-zone corresponding to the mobile communicator.

5. The method of claim 4, the selecting the traffic event comprising
   selecting an identified traffic event based on the user-zone.

6. The method of claim 5, the selecting the traffic event comprising
   selecting an identified traffic event based on whether the identified traffic event is located within the user-zone.

7. The method of claim 5, the selecting the traffic event comprising:

defining a shape and size of an event zone around each of the identified traffic events; and selecting an identified traffic event based on whether the event zone of the identified traffic event overlaps with the user-zone.

8. The method of claim 5, the selecting the traffic event comprising:

determining the user-zone as an area corresponding to the location of the mobile communicator; and determining a location of the mobile communicator.

9. The method of claim 8, the determining of the user-zone comprising determining a center of the user-zone repeatedly, wherein the user-zone has a center.

10. The method of claim 9, the determining the center of the user-zone comprising determining the center according to information regarding a speed of the mobile communicator.

11. The method of claim 8, the determining of the user-zone comprising determining an extent or a shape of the user-zone repeatedly, wherein the user-zone has an extent or a shape.

12. The method of claim 8, the determining the location of the mobile communicator comprising determining the location of the mobile communicator passively, i.e. without running an application on the mobile communication device.

13. The method of claim 12, the determining the location of the mobile communicator comprising determining the mobile communicator location from location data provided by one or more mobile communication stations of a mobile communication network.

14. The method of claim 13, wherein the mobile communication network is a cell phone network;

the mobile communication stations are towers of the cell phone network; and the mobile communicator location is determined by triangulation using data provided by the towers of the cell phone network.

15. The method of claim 12, the determining the location of the mobile communicator comprising determining the mobile communicator location from data provided by a global positioning system.

16. The method of claim 5, the selecting the traffic event comprising selecting the user-zone based on a characteristic of the selected traffic event.

17. The method of claim 16, the selecting the user-zone comprising selecting the user-zone to alert the mobile communicator in time to make a decision based on the characteristic of the traffic event.

18. The method of claim 17, wherein the traffic event is a traffic-jam;

the characteristic of the traffic event is an extent of the traffic-jam; and the user-zone is selected to alert the mobile communicator in time to avoid the traffic-jam.

19. The method of claim 4, the selecting the user-zone comprising selecting the user-zone based on mobile communicator information.

20. The method of claim 19, the selecting the user-zone based on mobile communicator information comprising at least one of:

selecting a user-zone based on an address selected by the mobile communicator; and selecting a user-zone based on a location of a person, selected by the mobile communicator.

21. The method of claim 4, wherein the user-zone has a hierarchical structure, comprising user-zone layers.

22. The method of claim 4, wherein an extent or shape of the user-zone is updated based on an update of a traffic information.

23. The method of claim 1, wherein the event zone has a hierarchical structure, comprising event zone layers.

24. The method of claim 1, wherein an extent or a shape of the event zone is updated based on an updated traffic information.

25. The method of claim 1, the identifying traffic events comprising identifying at least one of an accident, a traffic slow-down, a traffic-jam, a road-construction, and a traffic condition caused by at least one of a sporting event, an entertainment event, a weather event, and a traffic control event.

26. The method of claim 1, the selecting the traffic event comprising selecting the traffic event without requiring the mobile communicator to specify or program a traffic route.

27. The method of claim 1, the alerting the mobile communicator comprising alerting the mobile communicator without requiring the mobile communicator to respond by using hands.

28. The method of claim 1, the alerting the mobile communicator comprising alerting the mobile communicator without requiring the mobile communicator to terminate or interrupt an active application.

29. The method of claim 1, wherein the mobile communication device is one of a mobile telephone, a mobile computer, and an electronic device configured to operate in conjunction with a mobile data network.

30. The method of claim 1, the alerting the mobile communicator comprising alerting the mobile communicator on a separate communication line of the mobile communication device.

31. The method of claim 1, the alerting the mobile communicator with a message comprising alerting the mobile communicator with an alert-message comprising at least one of an audio component, a text component, an SMS, a video component, a radio broadcast component, a television broadcast component, a multimedia component, and a multimedia messaging service component.

32. The method of claim 31, wherein the alert-message comprises at least one of:

an audio component comprising a ring-tone;

an audio component comprising an instruction to tune to a traffic radio; and a video component comprising a live traffic camera broadcast.

33. The method of claim 31, the alerting the mobile communicator comprising:

selecting the alert-message component based on a location of the mobile communicator relative to the selected traffic event; and alerting the mobile communicator with the alert-message component.

34. The method of claim 1, the alerting the mobile communicator comprising
  offering traffic utility information regarding the selected traffic event.

35. The method of claim 34, the traffic utility information comprising
  information regarding at least one of an alternative route related to the traffic event, an expected duration of the traffic event, a parking information, an event information, and an exit near the mobile communicator's location.

36. The method of claim 34, the offering traffic utility information comprising at least one of
  offering traffic utility information in response to the mobile communicator requesting more information; and
  offering traffic utility information automatically launched on the mobile communication device.

37. The method of claim 34, the offering traffic utility information comprising one of
  offering the traffic utility information as part of an advertisement-based non-paying service; and
  offering the traffic utility information as part of a paying service.

38. The method of claim 37, the paying service comprising at least one of
  a monthly fee based service;
  a per-use service; and
  a service, billed in relation to the bill of the mobile communication service.

39. The method of claim 1, the alerting the mobile communicator further comprising
  offering sponsored information to the mobile communicator.

40. The method of claim 39, the offering sponsored information comprising:
  selecting information-sponsors based on the location of the mobile communicator; and
  offering sponsored information to the mobile communicator, sponsored by the selected information-sponsors.

41. The method of claim 40, the offering sponsored information comprising
  offering advertisements, sponsored by the selected information-sponsors.

42. The method of claim 1, the alerting the mobile communicator with a passive message comprising
  offering information in a hierarchical manner including multiple message components, the multiple message components to be delivered at different points in reference to the identified traffic events.

43. The method of claim 42, the alerting the mobile communicator in a hierarchical manner comprising at least two of the steps of:
  alerting the mobile communicator regarding the selected traffic event;
  offering traffic utility information; and
  offering sponsored information.

44. The method of claim 42, the offering information in a hierarchical manner comprising
  offering information with hierarchical components, the components comprising at least two of:
  an audio component, a text component, an SMS, a video component, a radio broadcast component, a television broadcast component, a multimedia component, and a multimedia messaging service component.

45. The method of claim 40, the offering sponsored information comprising at least one of:
  offering streaming sponsored information;
  offering download-and-play information; and
  offering audio-visual information.

46. The method of claim 39, the offering sponsored information comprising
  offering sponsored information via an Interactive Voice Response system.

47. The method of claim 40, the offering sponsored information comprising
  offering one or more of coupons, bar codes, and identifying marks in displayable electronic format.

48. The method of claim 39, further comprising
  offering access to on-line services.

49. The method of claim 48, the offering of online services comprising:
  verifying that the mobile communicator is at a location where gaming is legal; and
  offering access to on-line gaming.

50. The method of claim 1, further comprising
  providing a service for the mobile communicator to interact with the mobile communication device with voice commands.

51. A passive traffic alert method, comprising the steps of:
  identifying traffic events from analyzing traffic information;
  defining an event zone for each of the identified traffic events;
  selecting a user-zone based on a location related to a mobile communicator;
  selecting an identified traffic event based on a relation of identified traffic events, the event zone associated with each of the identified traffic events, and the user-zone; and
  alerting the mobile communicator with a passive message regarding the selected traffic event.

52. A passive traffic alert method, comprising the steps of:
  identifying traffic events from analyzing traffic information;
  defining events zones, each event zone associated with one of the identified traffic events;
  selecting an identified traffic event based on a location related to a mobile communicator and one of the event zones; and
  alerting the mobile communicator regarding the selected traffic event with a plurality of messages in a hierarchical manner.

53. A passive traffic alert method, comprising the steps of:
  determining an alert-zone by rating a traffic incident and overlaying a map of the incident, a map of cell-phone towers, and a map of a corresponding road network;
  acquiring user identification data of cell phone users from data from cell-phone towers in the alert-zone;
  identifying subscribers from the acquired user identification data;
  defining a dynamic user-zone for each of the identified subscribers based on a current location and rate of travel;
  matching identified subscribers with appropriate alerts based on the alert-zone and the dynamic user-zone for each subscriber; and
  sending appropriate alert messages to cell phones of the matching identified subscribers.

54. A server comprising:
  a processor coupled to a memory device, the processor configured to:
  identify traffic events from analyzing traffic information;
  select an identified traffic event based on a location related to a mobile communicator and an event zone defined around the identified traffic event, the event zone defining a dynamic two dimensional shape around the identified traffic event; and alert the mobile communicator with a passive message regarding the selected traffic event without prompting the mobile communicator to launch an application on a mobile communication device.

* * * * *